United States Patent
Morita et al.

(10) Patent No.: US 11,802,208 B2
(45) Date of Patent: Oct. 31, 2023

(54) STILBENE-BASED COMPOUND OR SALT THEREOF, AND POLARIZING FILM, POLARIZING PLATE, AND DISPLAY DEVICE

(71) Applicants: NIPPON KAYAKU KABUSHIKI KAISHA, Tokyo (JP); POLATECHNO CO., LTD., Joetsu (JP)

(72) Inventors: Ryoutarou Morita, Tokyo (JP); Noriaki Mochizuki, Tokyo (JP)

(73) Assignees: NIPPON KAYAKU KABUSHIKI KAISHA, Tokyo (JP); POLATECHNO CO., LTD., Niigata (JP)

(*) Notice: Subject to any disclaimer, the term of this patent is extended or adjusted under 35 U.S.C. 154(b) by 781 days.

(21) Appl. No.: 16/750,088

(22) Filed: Jan. 23, 2020

(65) Prior Publication Data

US 2020/0157353 A1 May 21, 2020

Related U.S. Application Data

(63) Continuation of application No. PCT/JP2018/028163, filed on Jul. 26, 2018.

(30) Foreign Application Priority Data

Jul. 28, 2017 (JP) .................. 2017-146354
Jul. 28, 2017 (JP) .................. 2017-146398

(51) Int. Cl.
| | | |
|---|---|---|
| C09B 23/14 | (2006.01) | |
| G02B 1/14 | (2015.01) | |
| C09B 51/00 | (2006.01) | |
| C09K 11/06 | (2006.01) | |
| G02B 5/30 | (2006.01) | |

(52) U.S. Cl.
CPC ............ C09B 23/148 (2013.01); C09B 51/00 (2013.01); C09K 11/06 (2013.01); G02B 1/14 (2015.01); G02B 5/3025 (2013.01); *C09K 2211/1007* (2013.01)

(58) Field of Classification Search
None
See application file for complete search history.

(56) References Cited

U.S. PATENT DOCUMENTS

| | | | |
|---|---|---|---|
| 2,394,998 A | 2/1946 | Keller | |
| 2,799,671 A | 7/1957 | Gunst | |
| 3,276,316 A | 10/1966 | Makes | |
| 5,007,942 A * | 4/1991 | Claussen | C08K 5/42 252/585 |
| 5,077,335 A | 12/1991 | Schwabe et al. | |
| 5,272,259 A | 12/1993 | Claussen et al. | |
| 6,291,442 B1 | 9/2001 | Yellen | |
| 9,629,945 B2 | 4/2017 | Kurdyumov et al. | |
| 2002/0061418 A1 | 5/2002 | Imanishi | |
| 2005/0089720 A1 | 4/2005 | Imanishi | |
| 2007/0119341 A1 | 5/2007 | Kitayama et al. | |
| 2012/0217151 A1 | 8/2012 | Matsuzawa et al. | |
| 2014/0098325 A1 | 4/2014 | Murata et al. | |
| 2019/0146280 A1 | 5/2019 | Murata et al. | |

FOREIGN PATENT DOCUMENTS

| | | |
|---|---|---|
| CH | 341163 A | 9/1959 |
| CN | 103649793 A | 3/2014 |
| CN | 103676288 A | 3/2014 |
| CN | 104017387 A | 9/2014 |
| CN | 104460098 A | 3/2015 |
| CN | 106094091 A | 11/2016 |
| CN | 107045227 A | 8/2017 |
| DE | 42 27 521 A1 | 2/1994 |
| EP | 1 669 413 A1 | 6/2006 |
| EP | 1 911 451 A1 | 4/2008 |
| GB | 862 225 | 3/1961 |
| GB | 1 484 732 | 9/1977 |
| GB | 2 203 426 A | 10/1988 |
| JP | 02-269136 A | 11/1990 |
| JP | 08-073762 A | 3/1996 |

(Continued)

OTHER PUBLICATIONS

Decision to Grant a Patent dated Mar. 29, 2022 in the relevant Taiwanese Application No. 107126159 and English translation.
Partial Supplementary European Seach Report dated Apr. 12, 2021 for corresponding European Application No. 18 839 316.9.
Fouquey et al., "Liquid Crystals for Non-Linear Optics: Mesophases Formed by Push-Pull Stilbenes and Diacetylenes", J. Chem. Soc., Chem. Commun., Jan. 1, 1987; pp. 1424-1426, XP001264319.
Noovi et al., "Synthesis and in vitro antitumor activity of substituted quinazoline and quinoxaline derivatives: Search for anticancer agent", European Journal of Medicinal Chemistry, Elsevier, Amsterdam, NL, vol. 46, No. 6, Mar. 7, 2011, pp. 2327-2346, XP028200019.
Song et a., "Fourier transform infrared spectroscopic studies on alternate-layer Langmuir-Blodgett films with nonlinear optical properties", Langmuir, vol. 8, No. 1, Jan. 1, 1992, pp. 262-266, XP055784706.

(Continued)

*Primary Examiner* — Jeffrey D Washville
(74) *Attorney, Agent, or Firm* — Pearne & Gordon LLP

(57) ABSTRACT

The present disclosure is a stilbene-based compound or a salt thereof represented by a following formula (1), wherein a group X represents a nitro group or an amino group optionally having a substituent; a group Y represents an amide group optionally having a substituent or a naphthotriazole group optionally having a substituent; and p and q each independently represent an integer of 0 to 2.

(1)

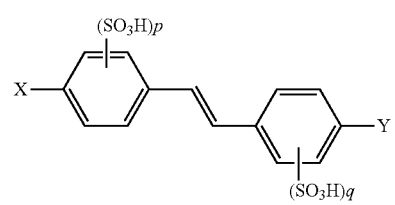

4 Claims, No Drawings

(56) References Cited

FOREIGN PATENT DOCUMENTS

| | | | |
|---|---|---|---|
| JP | 2001-174636 A | 6/2001 | |
| JP | 2001-174809 A | 6/2001 | |
| JP | 2001-264756 A | 9/2001 | |
| JP | 2001-318370 A | 11/2001 | |
| JP | 2002-110363 A1 | 4/2002 | |
| JP | 2003-035819 A | 2/2003 | |
| JP | 2005-274674 A | 10/2005 | |
| JP | 2006-208633 A | 8/2006 | |
| JP | 2007-264011 A | 10/2007 | |
| JP | 2008-033275 A | 2/2008 | |
| JP | 2008-224854 A | 9/2008 | |
| JP | 2011-231245 A | 11/2011 | |
| JP | 5713360 B2 | 5/2015 | |
| JP | 5849255 B2 | 1/2016 | |
| KR | 2014-0024636 A | 3/2014 | |
| TW | 201139343 A | 11/2011 | |
| WO | 2005/015275 A1 | 2/2005 | |
| WO | 2006/022442 A1 | 3/2006 | |
| WO | 2010/148177 A2 | 12/2010 | |

OTHER PUBLICATIONS

Decision to Grant a Patent dated May 12, 2022 in corresponding Chinese Application No. 201880049223.3 and English translation.
Decision to Grant a Patent dated Jun. 10, 2022 in the relevant Chinese Application No. 201880042198.6 and English translation.
Second Office Action dated Aug. 3, 2021 for corresponding Chinese Application No. 201880049223.3 and English translation.
Notice of Allowance dated Sep. 1 2022 for relevant Taiwanese Application No. 107126158 and English translation.
English translation of the Written Opinion for corresponding International Application No. PCT/JP2018/028163 dated Sep. 4, 2018.
International Preliminary Report on Patentability for corresponding International Application No. PCT/JP2018/028163 dated Jan. 28, 2020.
First Office Action dated Jan. 10, 2022 for corresponding Taiwan Application No. 107126157 and English translation (correction—Taiwan Application No. 107126157—previously submitted on Mar. 15, 2022).
International Search Report for corresponding International Application No. PCT/JP2018/028163 dated Sep. 4, 2018.
Written Opinion for corresponding International Application No. PCT/JP2018/028163 dated Sep. 4, 2018.
Yoshio Yamashita; "Fluorescence and Photostability of Aqueous Solution of Asymmetrically-substituted Derivatives of Sodium 4,4'-diaminostilbene-2, 2'-disulfonate"; Studies of Fluorescent Whitening Agents, Part V, 1972, pp. 818-822.
Extended European Search Report dated Jul. 13, 2021 for the corresponding European Application No. 18 839 316.9.
Kumar Amit et al., "Ultrahigh performance bio-based polymides from 4,4'-diaminostilbene", Polymer Elsevier Science Publishers B.V., GB. vol. 83, Dec. 17, 2015, pp. 182-189, XP029391587.

Makonen Belema et al., "Discovery and Development of Hepatitis C Virus NS5A Replication Complex Inhibitors", Journal of Medicinal Chemistry, Feb. 3, 2014, pp. 1-30, XP055106184.
Granchi Carlotta et al., "Anticancer Agents that Counteract Tumor Glycolysis", Chemmedchem Communications, vol. 7, No. 8, Jun. 8, 2012, pp. 1318-1350, XP055817508.
Bose Rohit et al., "Spectroscopic characterization by laser flash photolysis of electrophilic intermediates derived from 4-aminostilbenes. Stilbene "nitrenium" ions and quinone methide imines?+", Journal of the Chemical Society, Perkin Transactions, vol. 2, No. 8, Jan. 1, 1999, pp. 1591-1600, XP055817517.
Dobas J. et al., "Fluoreszierende Derivate Des 1,2,3-Triazols II.* Auf 4,4'-diaminostilben-2,2'-Disulfonsaure Basierende Benzo Und Naphthotriazolsulfonsauren", Collection of Czechoslovak Chemical Communications, vol. 23, Jan. 1, 1958, pp. 915-923, XP055817757.
First Office Action dated Jun. 25, 2021 for related Chinese Application No. 201880060210.6 and English translation.
First Office Action dated Nov. 25, 2021 for corresponding Taiwan Application No. 107126159 (16P0245TW) and English translation.
First Office Action dated Jun. 4, 2021 for related Chinese Application No. 201880042198.6 and English translation.
Notice of Reasons for Refusal dated Jul. 5, 2022 for corresponding Japanese Application No. 2019-532872 and English translation.
Notice of Allowance for Refusal dated Jul. 5, 2022 for corresponding Chinese Application No. 201880060210.6 and English translation.
Notice of Reasons for Refusal dated Jul. 5, 2022 for corresponding Japanese Application No. 2019-543455 and English translation.
Notice of Allowance dated Jul. 7, 2022 for corresponding Taiwan Application No. 107126157 and English translation.
Notice of Reasons for Refusal dated Jul. 13, 2022 for corresponding Japanese Application No. 2019-532873 and English translation.
First Office Action dated Jan. 11, 2021 for corresponding Chinese Application No. 201880049223.3 and English translation.
First Office Action dated Jan. 10, 2022 for corresponding Taiwan Application No. 107126159 and English translation.
First Office Action dated Jan. 14, 2022 for corresponding Taiwan Application No. 107126158 (18P0225TW) and English translation.
Second Office Action dated Jan. 19, 2022 for corresponding Chinese Application No. 201880042198.6 (18P0225WOCN) and English translation.
Third Office Action dated Jan. 25, 2022 for corresponding Chinese Application No. 201880049223.3 (16P0246WOCN) and English translation.
Second Office Action dated Feb. 7, 2022 for corresponding Chinese Application No. 201880060210.6 and English translation.
Decision to Grant a Patent dated Dec. 6, 2022 for relevant Japanese Application No. 2019-532872 and English translation.
Decision of Refusal dated Nov. 16, 2022 for relevant Japanese Application No. 2019-532873 and English translation.
Decision to Grant dated Oct. 26, 2022 for relevant Japanese Application No. 2019-543455 and English translation.

* cited by examiner

STILBENE-BASED COMPOUND OR SALT THEREOF, AND POLARIZING FILM, POLARIZING PLATE, AND DISPLAY DEVICE

CROSS REFERENCE TO RELATED APPLICATIONS

This is a continuation application of International Patent Application No. PCT/JP2018/028163 filed Jul. 26, 2018, which claims the benefit of Japanese Patent Application Nos. 2017-146398 and 2017-146354 filed Jul. 28, 2017, respectively, and the full contents of all of which are hereby incorporated by reference in their entirety.

BACKGROUND

Technical Field

The present disclosure relates to a novel stilbene-based compound or a salt thereof, and a polarizing film, polarizing plate, and display device using the stilbene-based compound or a salt thereof.

Description of the Related Art

Polarizing plates, which have light transmission and shielding functions, as well as liquid crystals, which have a light switching function, are a basic component of display devices for liquid crystal displays (LCDs) and so forth. Examples of fields of application of LCDs include early models of small devices including calculators and clocks, and laptop computers, word processors, liquid crystal projectors, liquid crystal televisions, car navigation systems, information display devices for outdoor and indoor uses, and measurement instruments. Such polarizing plates are also applicable to lenses with a polarizing function, and have been applied to sunglasses with improved visions and, recently, to polarizing glasses for 3D televisions, and further applied to common information terminals including wearable devices and put into practical use. Thus, polarizing plates have a wide range of uses, and hence are applied under a wide variety of conditions for use, such as low to high temperatures, low to high humidities, and low to high light intensities. For this reason, polarizing plates having high polarization performance and superior durability are demanded for application to various uses.

In general, polarizing films constituting polarizing plates are produced by allowing a substrate to be stained with or contain iodine or a dichroic dye as a polarizer, where the substrate is, for example, a stretched and oriented film of polyvinyl alcohol or a derivative thereof, or a polyene-based film obtained by generating a polyene through dehydrochlorination of a polyvinyl chloride film or dehydration of a polyvinyl alcohol-based film and orienting the polyene. Polarizing plates including such a conventional polarizing film have lower transmittance in the visible light region due to the use of the dichroic dyestuff with absorption of lights in the visible light region. For example, transmittance of typical commercially available polarizing plates is 35 to 45%.

When a polarizing plate having low transmittance in the visible light region is used for a display or the like, the overall transmittance of the display is decreased, and hence methods for providing polarized light without use of any conventional polarizing plate have been studied. As such a method, P Japanese Patent Application Publication No. 2008-224854, Japanese Patent No. 5849255 and Japanese Patent No. 5713360 each disclose a technique for causing emission of polarized light. However, these techniques suffer from scarcity value due to use of a special metal, for example, a lanthanoid metal such as europium (Eu) and terbium (Tb) as a material having the action of emitting polarized light (hereinafter, also referred to "polarized light-emitting action"), and from high difficulty in production, and thus are unsuitable for mass production. Further, it is difficult to apply those techniques to displays because of weak emission of polarized light. Hence, it has been demanded to develop a novel material that exhibits polarized light-emitting action without use of any conventional polarizing plate and is applicable even to liquid crystal displays or the like requiring high transparency in the visible light region and durability in severe environments.

SUMMARY

The present disclosure is related to providing a novel compound that exhibits polarized light-emitting action and is applicable to liquid crystal displays or the like requiring high transparency in the visible light region and high durability in severe environments; and a polarizing film, polarizing plate, and display device using the compound.

According to an aspect of the present disclosure, a stilbene-based compound or a salt thereof is represented by a following formula (1):

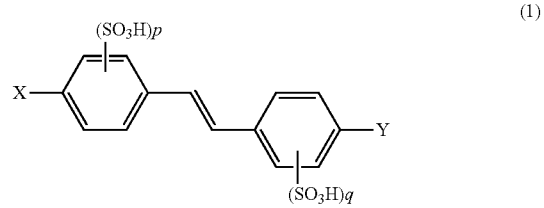

wherein a group X represents a nitro group or an amino group optionally having a substituent; a group Y represents an amide group optionally having a substituent or a naphthotriazole group optionally having a substituent; and p and q each independently represent an integer of 0 to 2.

Further, it is preferable that the stilbene-based compound represented by the formula (1) is represented by a following formula (2):

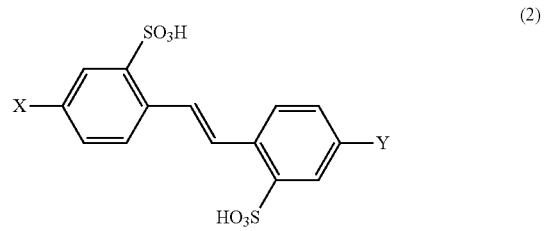

wherein groups X and Y are each as defined for the formula (1).

Further, it is preferable that the stilbene-based compound represented by the formula (1) is represented by a following formula (3):

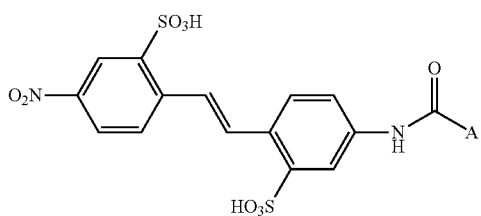

(3)

wherein a group A represents an alkyl group having 1 to 20 carbon atoms and optionally having a substituent, a vinyl group optionally having a substituent, or an aryl group optionally having a substituent.

Further, it is preferable that the group A in the formula (3) is an aryl group optionally having a substituent.

Further, it is preferable that the stilbene-based compound represented by the formula (3) is represented by a following formula (4):

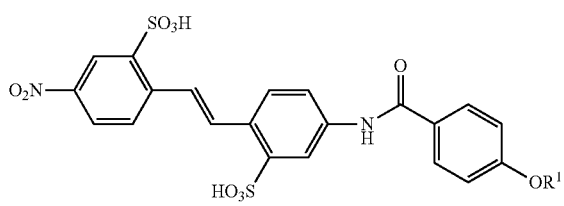

(4)

wherein a group $R^1$ represents a saturated hydrocarbon group having 1 to 10 carbon atoms and optionally having a substituent.

Further, it is preferable that the group $R^1$ in the formula (4) is a methyl group.

Further, it is preferable that the stilbene-based compound represented by the formula (1) is represented by a following formula (5):

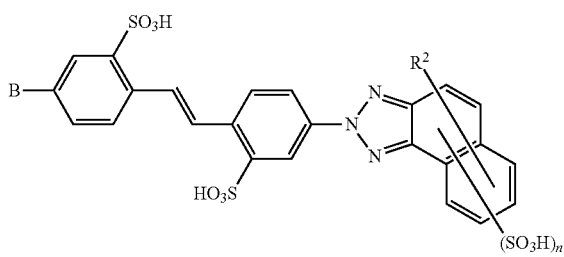

(5)

wherein a group B represents a nitro group or an amino group optionally having a substituent; a group $R^2$ represents a hydrogen atom, a halogen atom, a hydroxyl group, a carboxy group, a nitro group, an alkoxy group optionally having a substituent, or an amino group optionally having a substituent; and n represents an integer of 0 to 3.

Further, it is preferable that the group B in the formula (5) is a nitro group, an alkylcarbonylamino group having 1 to 20 carbon atoms and optionally having a substituent, an arylcarbonylamino group optionally having a substituent, an alkylsulfonylamino group having 1 to 20 carbon atoms, or an arylsulfonylamino group optionally having a substituent.

Further, it is preferable that the stilbene-based compound represented by the formula (5) is represented by a following formula (6):

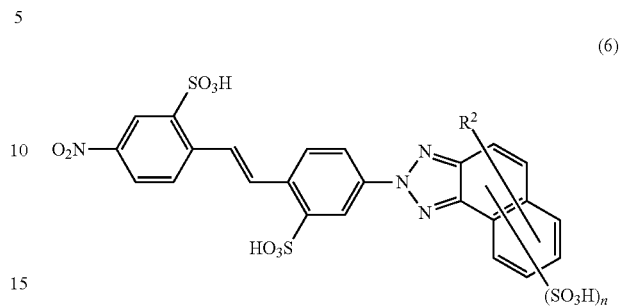

(6)

wherein a group $R^2$ is as defined for the formula (5); and n is an integer of 0 to 3.

Further, it is preferable that the group $R^2$ in the formula (6) is a hydrogen atom, and n is 1 or 2.

According to another aspect of the present disclosure, a polarizing film includes a substrate containing the stilbene-based compound or a salt thereof.

Further, it is preferable that the polarizing film has a polarized light-emitting function of emitting polarized light in a visible light region.

Further, it is preferable that the polarizing film further includes one or more organic dyes or fluorescent dyes differing from the stilbene-based compound or a salt thereof.

Further, it is preferable that the substrate is a film produced from a polyvinyl alcohol resin or a derivative thereof.

According to another aspect of the present disclosure, a polarizing plate includes the polarizing film; and a transparent protective layer provided on at least one surface of the polarizing film.

According to another aspect of the present disclosure, a display device includes the polarizing film or the polarizing plate.

The stilbene-based compound according to the present disclosure with a specific structure or a salt thereof absorbs ultraviolet light, and with use of the energy exhibits polarized light-emitting action in the visible light region. Polarizing films and polarizing plates produced by using the stilbene-based compound or a salt thereof exhibit a high degree of polarization in the ultraviolet light region. Therefore, even without use of a lanthanoid metal or the like of scarcity value, novel polarizing films and polarizing plates that have a high degree of polarization and exhibit polarized light-emitting action can be provided by using such a stilbene-based compound or a salt thereof. The polarizing film and polarizing plate according to the present disclosure exhibit high transmittance in the visible light region and further exhibit superior durability against heat, humidity, and so forth. Accordingly, the polarizing film and polarizing plate can be applied to display devices for liquid crystal displays and so forth requiring high transparency in the visible light region and high durability in severe environments.

DETAILED DESCRIPTION

Hereinafter, embodiments of the present disclosure will be described in detail. In the following description, each numerical range expressed with "to" indicates a range including the numerical value before "to" and that after "to" as the lower limit value and upper limit value, respectively.

Unless specifically stated, compounds represented by any formula and compounds shown in any compound example are each illustrated as the form of free acid (a state without forming a salt). Unless specifically stated, to avoid complexity, "the stilbene-based compound or a salt thereof" is occasionally represented for convenience in such a simple manner as "the stilbene-based compound".

Stilbene-Based Compound

The stilbene-based compound according to the present embodiment, which is represented by a formula (1) below, includes at least one stilbene backbone in the molecule. In the formula (1), a group X represents a nitro group or an amino group optionally having a substituent; a group Y represents an amide group optionally having a substituent or a naphthotriazole group optionally having a substituent; and p and q are each independently an integer of 0 to 2, and preferably 1. If p and q are each independently 1 or 2, —(SO$_3$H) may be bonding to any carbon in each benzene ring.

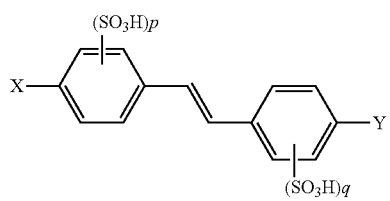

(1)

Thus, the stilbene-based compound represented by the formula (1) includes a stilbene backbone as a basic backbone. Because of the structure of the basic backbone, the stilbene-based compound represented by the formula (1) exhibits light-emitting action on being irradiated with ultraviolet light. Further, the molecule is stabilized with the presence of a strong carbon-carbon double bond in the stilbene backbone. Furthermore, the stilbene-based compound represented by the formula (1) does not include an azo bond in the molecule, in particular, in the group X and group Y, and hence absorption of light due to an azo bond is reduced. Accordingly, the stilbene-based compound according to the present embodiment with such a specific structure absorbs ultraviolet light, and with use of the energy can exhibit polarized light-emitting action in the visible light region, and in addition can be exist stably in polarizing films.

It is preferable that the stilbene-based compound represented by the formula (1) be represented by a formula (2) below. In the formula (2), groups X and Y are each as described for the formula (1). The stilbene-based compound represented by the formula (2) includes two sulfo groups at the specified positions. By the structure of the stilbene-based compound, the stilbene-based compound reacts with a cation present in a solution and can exist in the form of a stable salt via the sulfo groups. In addition, the stability of the molecule is enhanced because the two sulfo groups are in symmetric relation.

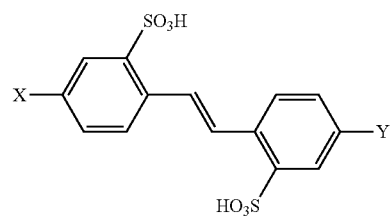

(2)

If the group Y in the formula (1) is an amide group optionally having a substituent, it is preferable that the stilbene-based compound according to the present embodiment be represented by a following formula (3).

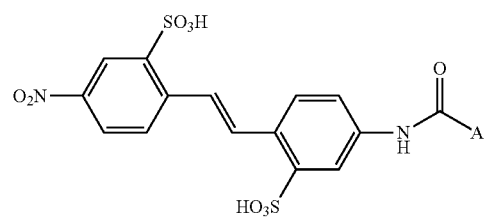

(3)

In the formula (3), a group A represents an alkyl group having 1 to 20 carbon atoms and optionally having a substituent, a vinyl group optionally having a substituent, or an aryl group optionally having a substituent, and it is preferable that the group A be an aryl group optionally having a substituent.

The alkyl group having 1 to 20 carbon atoms as the group A is, for example, a linear, branched, or cyclic alkyl group, and preferably a $C_1$-$C_{10}$ alkyl group. Specific examples of the $C_1$-$C_{10}$ alkyl group include: linear alkyl groups such as methyl, ethyl, n-propyl, n-butyl, n-pentyl, n-hexyl, n-heptyl, n-octyl, n-nonyl, and n-decyl;

branched $C_3$-$C_{10}$ alkyl groups such as isopropyl, isobutyl, sec-butyl, t-butyl, isoamyl, t-amyl, isohexyl, t-hexyl, isoheptyl, t-heptyl, isooctyl, t-octyl, 2-ethylhexyl, isononyl, and isodecyl; and cyclic $C_3$-$C_7$ alkyl groups such as cyclopropyl, cyclobutyl, cyclopentyl, cyclohexyl, and cycloheptyl.

Among them, linear or branched alkyl groups are preferred, and linear alkyl groups are more preferred.

Examples of the vinyl group as the group A include an ethenyl group, a propen-1-yl group, a propen-2-yl group, and a styryl group. Among them, an ethenyl group is preferred.

It is preferable that the aryl group as the group A be a $C_6$-$C_{b\ 12}$ aryl group or a five- or six-membered heterocycle group containing one to three heteroatoms selected from the group consisting of a nitrogen atom, an oxygen atom, and a sulfur atom. Specific examples of the $C_{b\ 6}$-$C_{12}$ aryl group include phenyl, naphthyl, and biphenyl. Specific examples of the heterocycle group include:

five-membered heteroalicyclic compounds such as pyrrolidinyl, tetrahydrofuryl, tetrahydrothiophen-2-yl, and tetrahydrothiophen-3-yl;

six-membered heteroalicyclic compounds such as piperidinyl, piperazinyl, dioxan-2-yl, morpholinyl, and thiomorpholinyl;

five-membered heterocyclic aromatic compounds such as pyrrole, pyrazole, imidazole, triazole, furyl, thiophen-2-yl, thiophen-3-yl, oxazole, and thiazole; and six-membered heterocyclic aromatic compounds such as pyridine, pyrazine, pyridazine, and triazine.

is preferable that the heterocycle moiety of the heterocycle group be an aromatic ring, and it is preferable that each heteroatom constituting the heterocycle be selected from a nitrogen atom and a sulfur atom.

The stilbene-based compound represented by the formula (3) is preferably represented by a following formula (4).

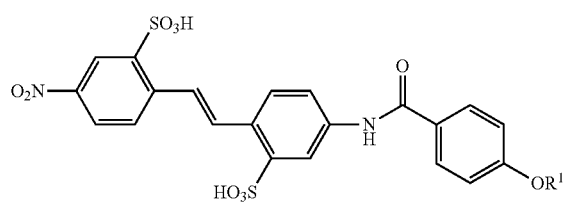

(4)

In the formula (4), a group $R^1$ represents a saturated hydrocarbon group having 1 to 10 carbon atoms and optionally having a substituent, and it is preferable that the group $R^1$ be a methyl group.

If the group Y in the formula (1) is a naphthotriazole group optionally having a substituent, it is preferable that the stilbene-based compound according to the present embodiment be represented by a following formula (5).

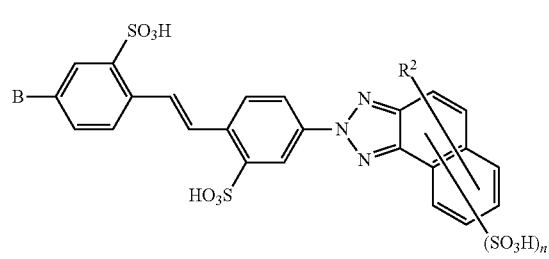

(5)

In the formula (5), a group B represents a nitro group or an amino group optionally having a substituent. It is preferable that the group B be, among them, a nitro group, an alkylamino group having 1 to 20 carbon atoms and optionally having a substituent, an alkylcarbonylamino group having 1 to 20 carbon atoms and optionally having a substituent, an arylcarbonylamino group optionally having a substituent, an alkylsulfonylamino group having 1 to 20 carbon atoms, or an arylsulfonylamino group optionally having a substituent, it is more preferable that the group B be a nitro group, an alkylcarbonylamino group having 1 to 20 carbon atoms and optionally having a substituent, an arylcarbonylamino group optionally having a substituent, an alkylsulfonylamino group having 1 to 20 carbon atoms, or an arylsulfonylamino group optionally having a substituent, and it is even more preferable that the group B be a nitro group.

If the group B is an amino group optionally having a substituent, it is preferable that the amino group be an alkylcarbonylamino group having 1 to 20 carbon atoms or an arylcarbonylamino group. By the group B being the carbonylamino group in the stilbene-based compound represented by the formula (5), the molecular orientation is more enhanced and the dichroism becomes higher. Thereby, the stilbene-based compound represented by the formula (5) can be obtained as a fluorescence-emitting compound having a high degree of polarization.

The alkyl group having 1 to 20 carbon atoms in the alkylamino group having 1 to 20 carbon atoms, alkylcarbonylamino group having 1 to 20 carbon atoms, and alkylsulfonylamino group having 1 to 20 carbon atoms is, for example, a linear, branched, or cyclic alkyl group, and preferably a $C_1$-$C_{10}$ alkyl group.

Specific examples of the $C_1$-$C_{10}$ alkyl group include:
linear alkyl groups such as methyl, ethyl, n-propyl, n-butyl, n-pentyl, n-hexyl, n-heptyl, n-octyl, n-nonyl, and n-decyl;
branched $C_3$-$C_{10}$ alkyl groups such as isopropyl, isobutyl, sec-butyl, t-butyl, isoamyl, t-amyl, isohexyl, t-hexyl, isoheptyl, t-heptyl, isooctyl, t-octyl, 2-ethylhexyl, isononyl, and isodecyl; and
cyclic $C_3$-$C_7$ alkyl groups such as cyclopropyl, cyclobutyl, cyclopentyl, cyclohexyl, and cycloheptyl.

Among them, linear or branched alkyl groups are preferred, and linear alkyl groups are more preferred.

It is preferable that the aryl group in the arylamino group, arylcarbonylamino group, and arylsulfonylamino group be a $C_6$-$C_{12}$ aryl group or a five- or six-membered heterocycle group containing one to three heteroatoms selected from the group consisting of a nitrogen atom, an oxygen atom, and a sulfur atom. Specific examples of the $C_6$-$C_{12}$ aryl group include phenyl, naphthyl, and biphenyl. Specific examples of the heterocycle group include: five-membered heteroalicyclic compounds such as pyrrolidinyl, tetrahydrofuryl, tetrahydrothiophen-2-yl, and tetrahydrothiophen-3-yl;
six-membered heteroalicyclic compounds such as piperidinyl, piperazinyl, dioxan-2-yl, morpholinyl, and thiomorpholinyl;
five-membered heterocyclic aromatic compounds such as pyrrole, pyrazole, imidazole, triazole, furyl, thiophen-2-yl, thiophen-3-yl, oxazole, and thiazole; and six-membered heterocyclic aromatic compounds such as pyridine, pyrazine, pyridazine, and triazine.

It is preferable that the heterocycle moiety of the heterocycle group be an aromatic ring, and it is preferable that each heteroatom constituting the heterocycle be selected from a nitrogen atom and a sulfur atom.

In the formula (5), a group $R^2$ represents a hydrogen atom, a halogen atom, a hydroxyl group, a carboxy group, a nitro group, an alkoxy group optionally having a substituent, or an amino group optionally having a substituent. It is preferable that the halogen atom as the group $R^2$ be, for example, a chlorine atom, a bromine atom, or a fluorine atom. It is preferable that the alkoxy group be, for example, a methoxy group or an ethoxy group. It is preferable that the amino group be, for example, a methylamino group, a dimethylamino group, an ethylamino group, a diethylamino group, or a phenylamino group. The group $R^2$ may be bonding to any carbon atom of the naphthalene ring in the naphthotriazole ring; however, it is preferable that the group $R^2$ be bonding to position 3, 5, or 8, where the positions of the carbon atoms fusing with the triazole ring are defined as positions 1 and 2.

n is an integer of 0 to 3, and preferably 1. Each —($SO_3H$) unit may be bonding to any carbon atom of the naphthalene ring in the naphthotriazole ring. It is preferable that the position(s) of the —($SO_3H$) unit(s) for bonding to the naphthalene ring be position 4, 6, or 7 for n=1, positions 5 and 7 or positions 6 and 8 for n=2, and the combination of positions 3, 6, and 8 for n=3, where the positions of the carbon atoms fusing with the triazole ring are defined as positions 1 and 2.

The stilbene-based compound represented by the formula (5) is preferably represented by a following formula (6).

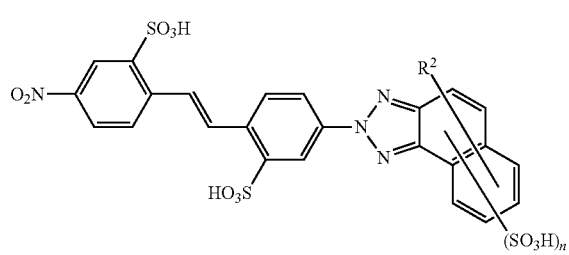

(6)

In the formula (6), a group $R^2$ is as defined for the formula (5), and it is preferable that the group $R^2$ be a hydrogen atom or a methyl group, and it is more preferable that the group $R^2$ be a hydrogen atom. n is an integer of 0 to 3, and it is preferable that n be 1 or 2.

It is preferable that the substituent in the amide group optionally having a substituent be the above-described alkyl group having 1 to 20 carbon atoms and optionally having a substituent, vinyl group optionally having a substituent, or aryl group optionally having a substituent. It is preferable that the substituent in the naphthotriazole group optionally having a substituent be the above-described group $R^2$ or —($SO_3H$). Examples of the substituents in the alkyl group having 1 to 20 carbon atoms and optionally having a substituent, vinyl group optionally having a substituent, aryl group optionally having a substituent, and amino group optionally having a substituent include a heterocyclic amino group, a fused ring-type heterocyclic amino group, an alkoxy group, an aryloxy group, an alkylcarbonylamino group, an arylcarbonylamino group, an alkylcarbonyloxy group, an arylcarbonyloxy group, an alkylcarbonyl group, an arylcarbonyl group, an unsubstituted carbamoyl group (—$CONH2$), an alkylcarbamoyl group, an arylcarbamoyl group, an alkoxycarbonyl group, an aryloxycarbonyl group, an alkylsulfonylamino group, an arylsulfonylamino group, an unsubstituted sulfamoyl group (—$SO_2NH_2$), an alkylsulfamoyl group, an arylsulfamoyl group, an alkylsulfonyl group, an arylsulfonyl group, an alkylthio group, an arylthio group, an unsubstituted ureide group (—$NHCONH_2$), an alkylureide group, an arylureide group, an alkoxycarbonylamino group, an aryloxycarbonylamino group, an unsubstituted amino group (—$NH_2$), an alkylamino group, an arylamino group, a hydroxyl group(—OH), a cyano group (—CN), a nitro group(—$NO_2$), a mercapto group (—SH), and a halogen atom.

The heterocyclic amino group is, for example, a five- or six-membered heterocyclic amino group containing one to three heteroatoms selected from the group consisting of a nitrogen atom, an oxygen atom, and a sulfur atom. Specific examples of such heterocyclic amino groups include:
five-membered heteroalicyclic amino groups such as pyrrolidinylamino, tetrahydrofurylamino, tetrahydrothiophen-2-ylamino, and tetrahydrothiophen-3-ylamino;
six-membered heteroalicyclic amino groups such as piperidinylamino, piperazinylamino, dioxan-2-ylamino, morpholinylamino, and thiomorpholinylamino;
five-membered aromatic heterocyclic amino groups such as pyrroleamino, pyrazoleamino, imidazoleamino, triazoleamino, furylamino, thiophen-2-ylamino, thiophen-3-ylamino, oxazoleamino, and thiazoleamino; and six-membered aromatic heterocyclic amino groups such as pyridylamino, pyrazylamino, pyridazinylamino, and triazinylamino.

It is preferable that the heterocycle moiety of the heterocycle group be an aromatic ring, and it is preferable that each heteroatom constituting the heterocycle be selected from a nitrogen atom and a sulfur atom.

The fused ring-type heterocyclic amino group is, for example, a fused ring-type five- or six-membered heterocyclic amino group formed by fusing one benzene ring to a five- or six-membered heterocycle group containing one to three heteroatoms selected from the group consisting of a nitrogen atom, an oxygen atom, and a sulfur atom. Specific examples of such fused ring-type heterocyclic amino groups include:
fused ring-type heteroalicyclic amino groups in which the heterocycle moiety is five-membered and alicyclic such as phthalanylamino;
fused ring-type heteroalicyclic amino groups in which the heterocycle moiety is six-membered and alicyclic such as benzopyranylamino;
fused ring-type aromatic heterocyclic amino groups in which the heterocycle moiety is a five-membered aromatic ring such as benzopyrrolamino, benzopyrazolamino, benzimidazolamino, benzotriazolamino, benzofuranylamino, benzothiophen-2-ylamino, benzothiophen-3-ylamino, benzoxazoleamino, and benzothiazoleamino; and
fused ring-type aromatic heterocyclic amino groups in which the heterocycle moiety is a six-membered aromatic ring such as quinolinylamino, cinnolinylamino, phthalazinylamino, quinazolinylamino, and quinoxalinylamino.

It is preferable that the heterocycle moiety of the heterocycle group be an aromatic ring, and it is preferable that each heteroatom constituting the heterocycle be selected from a nitrogen atom and a sulfur atom.

The alkoxy group is, for example, a linear, branched, or cyclic alkoxy group, and preferably a $C_1$-$C_{10}$ alkoxy group. Specific examples of the $C_1$-$C_{10}$ alkoxy group include:
linear alkoxy groups such as methoxy, ethoxy, n-propoxy, n-butoxy, n-pentoxy, n-hexyloxy, n-heptoxy, n-octyloxy, n-nonyloxy, and n-decyloxy;
branched $C_3$-$C_{10}$ alkoxy groups such as isopropoxy, isobutoxy, sec-butoxy, t-butoxy, isoamyloxy, t-amyloxy, isohexyloxy, t-hexyloxy, isoheptoxy, t-heptoxy, isooctyloxy, t-octyloxy, 2-ethylhexyloxy, isononyloxy, and isodecyloxy; and
cyclic $C_3$-$C_7$ alkoxy groups such as cyclopropoxy, cyclobutoxy, cyclopentoxy, cyclohexyloxy, and cycloheptoxy.
Among them, linear or branched alkoxy groups are preferred.

The aryloxy group is preferably a $C_6$-$C_{12}$ aryloxy group, and specific examples thereof include phenoxy, naphthyloxy, and biphenyloxy.

The alkylcarbonylamino group is, for example, a linear, branched, or cyclic alkylcarbonylamino group, and preferably a $C_1$-$C_{10}$ alkylcarbonylamino group. Specific examples of the $C_1$-$C_{10}$ alkylcarbonylamino group include: linear alkylcarbonylamino groups such as methylcarbonylamino, ethylcarbonylamino, n-propylcarbonylamino, n-butylcarbonylamino, n-pentylcarbonylamino, n-hexylcarbonylamino, n-heptylcarbonylamino, n-octylcarbonylamino, n-nonylcarbonylamino, and n-decylcarbonylamino; branched $C_3$-$C_{10}$ alkylcarbonylamino groups such as isopropylcarbonylamino, isobutylcarbonylamino, sec-butylcarbonylamino, t-butylcarbonylamino, isoamylcarbonylamino, t-amylcarbonylamino, isohexylcarbonylamino, t-hexylcarbonylamino, isoheptylcarbonylamino, t-heptylcarbonylamino, isooctylcarbonylamino, t-octylcarbonylamino, 2-ethylhexylcarbonylamino, isononylcarbonylamino, and isodecylcarbonylamino; and cyclic $C_3$-$C_7$ alkylcarbonylamino groups such as cyclopropylcarbonylamino, cyclobutylcarbonylamino, cyclopentylcarbonylamino, cyclohexylcarbonylamino, and cycloheptylcarbonylamino.

Among them, linear or branched alkylcarbonylamino groups are preferred, and linear alkylcarbonylamino groups are more preferred.

The arylcarbonylamino group is preferably a $C_6$-$C_{12}$ arylcarbonylamino group, and specific examples thereof include phenylcarbonylamino, naphthylcarbonylamino, and biphenylcarbonylamino.

The alkylcarbonyloxy group is, for example, a linear, branched, or cyclic alkylcarbonyloxy group, and preferably a $C_1$-$C_{10}$ alkylcarbonyloxy group. Specific examples of the $C_1$-$C_{10}$ alkylcarbonyloxy group include:

linear alkylcarbonyloxy groups such as methylcarbonyloxy, ethylcarbonyloxy, n-propylcarbonyloxy, n-butylcarbonyloxy, n-pentylcarbonyloxy, n-hexylcarbonyloxy, n-heptylcarbonyloxy, n-octylcarbonyloxy, n-nonylcarbonyloxy, and n-decylcarbonyloxy;

branched $C_3$-$C_{10}$ alkylcarbonyloxy groups such as isopropylcarbonyloxy, isobutylcarbonyloxy, sec-butylcarbonyloxy, t-butylcarbonyloxy, isoamylcarbonyloxy, t-amylcarbonyloxy, isohexylcarbonyloxy, t-hexylcarbonyloxy, isoheptylcarbonyloxy, t-heptylcarbonyloxy, isooctylcarbonyloxy, t-octylcarbonyloxy, 2-ethylhexylcarbonyloxy, isononylcarbonyloxy, and isodecylcarbonyloxy; and cyclic $C_3$-$C_7$ alkylcarbonyloxy groups such as cyclopropylcarbonyloxy, cyclobutylcarbonyloxy, cyclopentylcarbonyloxy, cyclohexylcarbonyloxy, and cycloheptylcarbonyloxy.

Among them, linear or branched alkylcarbonyloxy groups are preferred, and linear alkylcarbonyloxy groups are more preferred.

The arylcarbonyloxy group is preferably a $C_6$-$C_{12}$ arylcarbonyloxy group, and specific examples thereof include phenylcarbonyloxy, naphthylcarbonyloxy, and biphenylcarbonyloxy.

The alkylcarbonyl group is, for example, a linear, branched, or cyclic alkylcarbonyl group, and preferably a $C_1$-$C_{10}$ alkylcarbonyl group. Specific examples of the $C_1$-$C_{10}$ alkylcarbonyl group include: linear alkylcarbonyl groups such as methylcarbonyl, ethylcarbonyl, n-propylcarbonyl, n-butylcarbonyl, n-pentylcarbonyl, n-hexylcarbonyl, n-heptylcarbonyl, n-octylcarbonyl, n-nonylcarbonyl, and n-decylcarbonyl; branched $C_3$-$C_{10}$ alkylcarbonyl groups such as isopropylcarbonyl, isobutylcarbonyl, sec-butylcarbonyl, t-butylcarbonyl, isoamylcarbonyl, t-amylcarbonyl, isohexylcarbonyl, t-hexylcarbonyl, isoheptylcarbonyl, t-heptylcarbonyl, isooctylcarbonyl, t-octylcarbonyl, 2-ethylhexylcarbonyl, isononylcarbonyl, and isodecylcarbonyl; and cyclic $C_3$-$C_7$ alkylcarbonyl groups such as cyclopropylcarbonyl, cyclobutylcarbonyl, cyclopentylcarbonyl, cyclohexylcarbonyl, and cycloheptylcarbonyl.

Among them, linear or branched alkylcarbonyl groups are preferred, and linear alkylcarbonyl are more preferred.

The arylcarbonyl group is preferably a $C_6$-$C_{12}$ arylcarbonyl group, and specific examples thereof include phenylcarbonyl(benzoyl), naphthylcarbonyl, and biphenylcarbonyl.

The alkylcarbamoyl group is, for example, a linear, branched, or cyclic monoalkylcarbamoyl group or dialkylcarbamoyl group. The monoalkylcarbamoyl group is preferably a mono-$C_1$-$C_{10}$ alkylcarbamoyl group, and specific examples thereof include:

linear monoalkylcarbamoyl groups such as methylcarbamoyl, ethylcarbamoyl, n-propylcarbamoyl, n-butylcarbamoyl, n-pentylcarbamoyl, n-hexylcarbamoyl, n-heptylcarbamoyl, n-octylcarbamoyl, n-nonylcarbamoyl, and n-decylcarbamoyl;

branched mono-$C_3$-$C_{10}$ alkylcarbamoyl groups such as isopropylcarbamoyl, isobutylcarbamoyl, sec-butylcarbamoyl, t-butylcarbamoyl, isoamylcarbamoyl, t-amylcarbamoyl, isohexylcarbamoyl, t-hexylcarbamoyl, isoheptylcarbamoyl, t-heptylcarbamoyl, isooctylcarbamoyl, t-octylcarbamoyl, 2-ethylhexylcarbamoyl, isononylcarbamoyl, and isodecylcarbamoyl; and cyclic mono-$C_3$-$C_7$ alkylcarbamoyl groups such as cyclopropylcarbamoyl, cyclobutylcarbamoyl, cyclopentylcarbamoyl, cyclohexylcarbamoyl, and cycloheptylcarbamoyl.

Among them, linear or branched monoalkylcarbamoyl groups are preferred, and linear monoalkylcarbamoyl groups are more preferred.

The dialkylcarbamoyl group is preferably a di-$C_1$-$C_{10}$ alkylcarbamoyl group, and specific examples thereof include:

linear dialkylcarbamoyl groups such as dimethylcarbamoyl, diethylcarbamoyl, di-n-propylcarbamoyl, di-n-butylcarbamoyl, di-n-pentylcarbamoyl, di-n-hexylcarbamoyl, di-n-heptylcarbamoyl, di-n-octylcarbamoyl, di-n-nonylcarbamoyl, and di-n-decylcarbamoyl;

branched di-$C_3$-$C_{10}$ alkylcarbamoyl groups having two alkyl groups as branched chains such as diisopropylcarbamoyl, diisobutylcarbamoyl, di-sec-butylcarbamoyl, di-t-butylcarbamoyl, diisoamylcarbamoyl, di-t-amylcarbamoyl, diisohexylcarbamoyl, di-t-hexylcarbamoyl, diisoheptylcarbamoyl, di-t-heptylcarbamoyl, diisooctylcarbamoyl, di-t-octylcarbamoyl, di-(2-ethylhexyl)carbamoyl, diisononylcarbamoyl, and diisodecylcarbamoyl; and cyclic di-$C_3$-$C_7$ alkylcarbamoyl groups having two rings such as dicyclopropylcarbamoyl, dicyclobutylcarbamoyl, dicyclopentylcarbamoyl, dicyclohexylcarbamoyl, and dicycloheptylcarbamoyl.

Among them, linear or branched dialkylcarbamoyl groups are preferred, and linear dialkylcarbamoyl groups are more preferred.

The arylcarbamoyl group is, for example, a monoarylcarbamoyl group or a diarylcarbamoyl group. The monoarylcarbamoyl group is preferably a mono-$C_6$-$C_{12}$ arylcarbamoyl group, and specific examples thereof include phenylcarbamoyl, naphthylcarbamoyl, and biphenylcarbamoyl.

The diarylcarbamoyl group is preferably a di-$C_6$-$C_{12}$ arylcarbamoyl group, and specific examples thereof include diphenylcarbamoyl, dinaphthylcarbamoyl, and di(biphenyl)carbamoyl.

The alkoxycarbonyl group is, for example, a linear, branched, or cyclic alkoxycarbonyl group, and preferably a $C_1$-$C_{10}$ alkoxycarbonyl group. Specific examples of the $C_1$-$C_{10}$ alkoxycarbonyl group include:

linear alkoxycarbonyl groups such as methoxycarbonyl, ethoxycarbonyl, n-propoxycarbonyl, n-butoxycarbonyl, n-pentoxycarbonyl, n-hexyloxycarbonyl, n-heptoxycarbonyl, n-octyloxycarbonyl, n-nonyloxycarbonyl, and n-decyloxycarbonyl;

branched $C_3$-$C_{10}$ alkoxycarbonyl groups such as isopropoxycarbonyl, isobutoxycarbonyl, sec-butoxycarbonyl, t-butoxycarbonyl, isoamyloxycarbonyl, t-amyloxycarbonyl, isohexyloxycarbonyl, t-hexyloxycarbonyl, isoheptoxycarbonyl, t-heptoxycarbonyl, isooctyloxycarbonyl, t-octyloxycarbonyl, 2-ethylhexyloxycarbonyl, isononyloxycarbonyl, and isodecyloxycarbonyl; and cyclic $C_3$-$C_7$ alkoxycarbonyl groups such as cyclopropoxycarbonyl, cyclobutoxycarbonyl, cyclopentoxycarbonyl, cyclohexyloxycarbonyl, and cycloheptoxycarbonyl.

Among them, linear or branched alkoxycarbonyl groups are preferred, and linear alkoxycarbonyl groups are more preferred.

The aryloxycarbonyl group is preferably a $C_6$-$C_{12}$ aryloxycarbonyl group, and specific examples thereof include phenoxycarbonyl, naphthyloxycarbonyl, and biphenyloxycarbonyl.

The alkylsulfonylamino group is, for example, a linear, branched, or cyclic alkylsulfonylamino group, and preferably a $C_1$-$C_{10}$ alkylsulfonylamino group. Specific examples of the $C_1$-$C_{10}$ alkylsulfonylamino group include: linear alkylsulfonylamino groups such as methylsulfonylamino, ethylsulfonylamino, n-pr opylsulfonylamino, n-butylsulfonylamino, n-pentylsulfonylamino, n-hexylsulfonylamino, n-heptylsulfonylamino, n-octylsulfonylamino, n-nonylsulfonylamino, and n-decylsulfonylamino; branched $C_3$-$C_{10}$ alkylsulfonylamino groups such as isopropylsulfonylamino, isobutylsulfonylamino, sec-butylsulfonylamino, t-butylsulfonylamino, isoamylsulfonylamino, t-amylsulfonylamino, isohexylsulfonylamino, t-hexylsulfonylamino, isoheptylsulfonylamino, t-heptylsulfonylamino, isooctylsulfonylamino, t-octylsulfonylamino, 2-ethylhexylsulfonylamino, isononylsulfonylamino, and isodecylsulfonylamino; and cyclic $C_3$-$C_7$ alkylsulfonylamino groups such as cyclopropylsulfonylamino, cyclobutylsulfonylamino, cyclopentylsulfonylamino, cyclohexylsulfonylamino, and cycloheptylsulfonylamino.

Among them, linear or branched alkylsulfonylamino groups are preferred, and linear alkylsulfonylamino groups are more preferred.

The arylsulfonylamino group is preferably a $C_6$-$C_{12}$ arylsulfonylamino group, and specific examples thereof include phenylsulfonylamino, toluenesulfonylamino, naphthylsulfonylamino, and biphenylsulfonylamino.

The alkylsulfamoyl group is, for example, a linear, branched, or cyclic monoalkylsulfamoyl group or dialkylsulfamoyl group. The monoalkylsulfamoyl group is preferably a mono-$C_1$-$C_{10}$ alkylsulfamoyl group, and specific examples thereof include:
linear monoalkylsulfamoyl groups such as methylsulfamoyl, ethylsulfamoyl, n-propylsulfamoyl, n-butylsulfamoyl, n-pentylsulfamoyl, n-hexylsulfamoyl, n-heptylsulfamoyl, n-octylsulfamoyl, n-nonylsulfamoyl, and n-decylsulfamoyl;
branched mono-$C_3$-$C_{10}$ alkylsulfamoyl groups such as isopropylsulfamoyl, isobutylsulfamoyl, sec-butylsulfamoyl, t-butylsulfamoyl, isoamylsulfamoyl, t-amylsulfamoyl, isohexylsulfamoyl, t-hexylsulfamoyl, isoheptylsulfamoyl, t-heptylsulfamoyl, isooctylsulfamoyl, t-octylsulfamoyl, 2-ethylhexylsulfamoyl, isononylsulfamoyl, and isodecylsulfamoyl; and
cyclic mono-$C_3$-$C_7$ alkylsulfamoyl groups such as cyclopropylsulfamoyl, cyclobutylsulfamoyl, cyclopentylsulfamoyl, cyclohexylsulfamoyl, and cycloheptylsulfamoyl.

Among them, linear or branched monoalkylsulfamoyl groups are preferred, and linear monoalkylsulfamoyl groups are more preferred.

The dialkylsulfamoyl group is preferably a di-$C_1$-$C_{10}$ alkylsulfamoyl group, and specific examples thereof include:
linear dialkylsulfamoyl groups such as dimethylsulfamoyl, diethylsulfamoyl, di-n-pr opylsulfamoyl, di-n-butylsulfamoyl, di-n-pentylsulfamoyl, di-n-hexylsulfamoyl, di-n-heptylsulfamoyl, di-n-octylsulfamoyl, di-n-nonylsulfamoyl, and di-n-decylsulfamoyl;
branched di-$C_3$-$C_{10}$ alkylsulfamoyl groups having two alkyl groups as branched chains such as diisopropylsulfamoyl, diisobutylsulfamoyl, di-sec-butylsulfamoyl, di-t-butylsulfamoyl, diisoamylsulfamoyl, di-t-amylsulfamoyl, diisohexylsulfamoyl, di-t-hexylsulfamoyl, diisoheptylsulfamoyl, di-t-heptylsulfamoyl, diisooctylsulfamoyl, di-t-octylsulfamoyl, di-(2-ethylhexyl)sulfamoyl, diisononylsulfamoyl, and diisodecylsulfamoyl; and cyclic di-$C_3$-$C_7$ alkylsulfamoyl groups having two rings such as dicyclopropylsulfamoyl, dicyclobutylsulfamoyl, dicyclopentylsulfamoyl, dicyclohexylsulfamoyl, and dicycloheptylsulfamoyl.

Among them, linear or branched dialkylsulfamoyl groups are preferred, and linear dialkylsulfamoyl groups are more preferred.

The arylsulfamoyl group is, for example, a monoarylsulfamoyl group or a diarylsulfamoyl group. The monoarylsulfamoyl group is preferably a mono-$C_6$-$C_{12}$ arylsulfamoyl group, and specific examples thereof include phenylsulfamoyl, naphthylsulfamoyl, and biphenylsulfamoyl.

The diarylsulfamoyl group is preferably a di-$C_6$-$C_{12}$ arylsulfamoyl group, and specific examples thereof include diphenylsulfamoyl, dinaphthylsulfamoyl, and di(biphenyl)sulfamoyl.

The alkylsulfonyl group is, for example, a linear, branched, or cyclic alkylsulfonyl group, and preferably a $C_1$-$C_{12}$ alkylsulfonyl group. Specific examples of the $C_1$-$C_{12}$ alkylsulfonyl group include:
linear alkylsulfonyl groups such as methylsulfonyl, ethylsulfonyl, n-propylsulfonyl, n-butylsulfonyl, n-pentylsulfonyl, n-hexylsulfonyl, n-heptylsulfonyl, n-octylsulfonyl, n-nonylsulfonyl, n-decylsulfonyl, n-undecylsulfonyl, and n-dodecylsulfonyl;
branched $C_3$-$C_{12}$ alkylsulfonyl groups such as isopropylsulfonyl, isobutylsulfonyl, sec-butylsulfonyl, t-butylsulfonyl, isoamylsulfonyl, t-amylsulfonyl, isohexylsulfonyl, t-hexylsulfonyl, isoheptylsulfonyl, t-heptylsulfonyl, isooctylsulfonyl, t-octylsulfonyl, 2-ethylhexylsulfonyl, isononylsulfonyl, isodecylsulfonyl, isoundecylsulfonyl, t-undecylsulfonyl, isododecylsulfonyl, and t-dodecylsulfonyl; and
cyclic $C_3$-$C_7$ alkylsulfonyl groups such as cyclopropylsulfonyl, cyclobutylsulfonyl, cyclopentylsulfonyl, cyclohexylsulfonyl, and cycloheptylsulfonyl.

Among them, linear or branched alkylsulfonyl groups are preferred, and linear alkylsulfonyl groups are more preferred.

The arylsulfonyl group is preferably a $C_6$-$C_{12}$ arylsulfonyl group, and specific examples thereof include phenylsulfonyl, naphthylsulfonyl, and biphenylsulfonyl.

The alkylthio group is, for example, a linear, branched, or cyclic alkylthio group, and preferably a $C_1$-$C_{10}$ alkylthio group. Specific examples of the $C_1$-$C_{10}$ alkylthio group include:
linear alkylthio groups such as methylthio, ethylthio, n-propylthio, n-butylthio, n-pentylthio, n-hexylthio, n-heptylthio, n-octylthio, n-nonylthio, and n-decylthio;
branched $C_3$-$C_{10}$ alkylthio groups such as isopropylthio, isobutylthio, sec-butylthio, t-butylthio, isoamylthio, t-amylthio, isohexylthio, t-hexylthio, isoheptylthio, t-heptylthio, isooctylthio, t-octylthio, 2-ethylhexylthio, isononylthio, and isodecylthio; and
cyclic $C_3$-$C_7$ alkylthio groups such as cyclopropylthio, cyclobutylthio, cyclopentylthio, cyclohexylthio, and cycloheptylthio.

Among them, linear or branched alkylthio groups are preferred, and linear alkylthio groups are more preferred.

The arylthio group is preferably a $C_6$-$C_{12}$ arylthio group, and specific examples thereof include phenylthio, naphthylthio, and biphenylthio.

The alkylureide group is, for example, a linear, branched, or cyclic monoalkylureide group or dialkylureide group. The monoalkylureide group is preferably a mono-$C_1$-$C_{10}$ alkylureide group, and specific examples thereof include:
linear monoalkylureide groups such as methylureide, ethylureide, n-propylureide, n-butylureide, n-pentylureide, n-hexylureide, n-heptylureide, n-octylureide, n-nonylureide, and n-decylureide;
branched mono-$C_3$-$C_{10}$ alkylureide groups such as isopropylureide, isobutylureide, sec-butylureide, t-butylureide, isoamylureide, t-amylureide, isohexylureide, t-hexylureide, isoheptylureide, t-heptylureide, isooctylureide, t-octylureide, 2-ethylhexylureide, isononylureide, and isodecylureide; and cyclic mono-$C_3$-$C_7$ alkylureide groups such as cyclopropylureide, cyclobutylureide, cyclopentylureide, cyclohexylureide, and cycloheptylureide. Among them, linear or branched alkylureide groups are preferred, and linear alkylureide groups are exemplified.

The dialkylureide group is preferably a di-$C_1$-$C_{10}$ alkylureide group, and specific examples thereof include:
linear dialkylureide groups such as dimethylureide, diethylureide, di-n-propylureide, di-n-butylureide, di-n-pentylureide, di-n-hexylureide, di-n-heptylureide, di-n-octylureide, di-n-nonylureide, and di-n-decylureide;
branched di-$C_3$-$C_{10}$ alkylureide groups having two alkyl groups as branched chains such as diisopropylureide, diisobutylureide, di-sec-butylureide, di-t-butylureide, diisoamylureide, di-t-amylureide, diisohexylureide, di-t-hexylureide, diisoheptylureide, di-t-heptylureide, diisooctylureide, di-t-octylureide, di-(2-ethylhexyl)ureide, diisononylureide, and diisodecylureide; and
cyclic di-$C_3$-$C_7$ alkylureide groups having two rings such as dicyclopropylureide, dicyclobutylureide, dicyclopentylureide, dicyclohexylureide, and dicycloheptylureide.
Among them, linear or branched dialkylureide groups are preferred, and linear dialkylureide groups are more preferred.

The arylureide group is, for example, a monoarylureide group or a diarylureide group. The monoarylureide group is preferably a mono-$C_6$-$C_{12}$ arylureide group, and specific examples thereof include phenylureide, naphthylureide, and biphenylureide.

The diarylureide group is preferably a di-$C_6$-$C_{12}$ arylureide group, and specific examples thereof include diphenylureide, dinaphthylureide, and di(biphenyl)ureide.

The alkoxycarbonylamino group is, for example, a linear, branched, or cyclic alkoxycarbonylamino group, and preferably a $C_1$-$C_{10}$ alkoxycarbonylamino group. Specific examples of the $C_1$-$C_{10}$ alkoxycarbonylamino group include:
linear alkoxycarbonylamino groups such as methoxycarbonylamino, ethoxycarbonylamino, n-propoxycarbonylamino, n-butoxycarbonylamino, n-pentoxycarbonylamino, n-hexyloxycarbonylamino, n-heptoxycarbonylamino, n-octyloxycarbonylamino, n-nonyloxycarbonylamino, and n-decyloxycarbonylamino;
branched $C_3$-$C_{10}$ alkoxycarbonylamino groups such as isopropoxycarbonylamino, isobutoxycarbonylamino, sec-butoxycarbonylamino, t-butoxycarbonylamino, isoamyloxycarbonylamino, t-amyloxycarbonylamino, isohexyloxycarbonylamino, t-hexyloxycarbonylamino, isoheptoxycarbonylamino, t-heptoxycarbonylamino, isooctyloxycarbonylamino, t-octyloxycarbonylamino, 2-ethylhexyloxycarbonylamino, isononyloxycarbonylamino, and isodecyloxycarbonylamino; and cyclic $C_3$-$C_7$ alkoxycarbonylamino groups such as cyclopropoxycarbonylamino, cyclobutoxycarbonylamino, cyclopentoxycarbonylamino, cyclohexyloxycarbonylamino, and cycloheptoxycarbonylamino.
Among them, linear or branched alkoxycarbonylamino groups are preferred, and linear alkoxycarbonylamino groups are more preferred.

The aryloxycarbonylamino group is preferably a $C_6$-$C_{12}$ aryloxycarbonylamino group, and specific examples thereof include phenylcarbonylamino, naphthylcarbonylamino, and biphenylcarbonylamino.

The alkylamino group is, for example, a linear, branched, or cyclic monoalkylamino group or dialkylamino group. The monoalkylamino group is preferably a mono-$C_1$-$C_{10}$ alkylamino group, and specific examples thereof include:
linear monoalkylamino groups such as methylamino, ethylamino, n-propylamino, n-butylamino, n-pentylamino, n-hexylamino, n-heptylamino, n-octylamino, n-nonylamino, and n-decylamino;
branched mono-$C_3$-$C_{10}$ alkylamino groups such as isopropylamino, isobutylamino, sec-butylamino, t-butylamino, isoamylamino, t-amylamino, isohexylamino, t-hexylamino, isoheptylamino, t-heptylamino, isooctylamino, t-octylamino, 2-ethylhexylamino, isononylamino, and isodecylamino; and cyclic mono-$C_3$-$C_7$ alkylamino groups such as cyclopropylamino, cyclobutylamino, cyclopentylamino, cyclohexylamino, and cycloheptylamino. Among them, linear or branched monoalkylamino groups are preferred, and linear monoalkylamino groups are more preferred.

The dialkylamino group is preferably a di-$C_1$-$C_{10}$ alkylamino group, and specific examples thereof include:
linear dialkylamino groups such as dimethylamino, diethylamino, di-n-propylamino, di-n-butylamino, di-n-pentylamino, di-n-hexylamino, di-n-heptylamino, di-n-octylamino, di-n-nonylamino, and di-n-decylamino; branched di-$C_3$-$C_{10}$ alkylamino group having two alkyl groups as branched chains such as diisopropylamino, diisobutylamino, di-sec-butylamino, di-t-butylamino, diisoamylamino, di-t-amylamino, diisohexylamino, di-t-hexylamino, diisoheptylamino, di-t-heptylamino, diisooctylamino, di-t-octylamino, di-(2-ethylhexyl)amino, diisononylamino, and diisodecylamino; and cyclid di-$C_3$-$C_7$ alkylamino groups having two rings such as dicyclopropylamino, dicyclobutylamino, dicyclopentylamino, dicyclohexylamino, and dicycloheptylamino.
Among them, linear or branched dialkylamino groups are preferred, and linear dialkylamino groups are more preferred.

The arylamino group is, for example, a monoarylamino group or a diarylamino group. The monoarylamino group is preferably a mono-$C_6$-$C_{12}$ arylamino group, and specific examples thereof include phenylamino(anilino), naphthylamino, and biphenylamino.

The diarylamino group is preferably a di-$C_6$-$C_{12}$ arylamino group, and specific examples thereof include diphenylamino, dinaphthylamino, and di(biphenyl)amino.

The halogen atom is, for example, a fluorine atom, a chlorine atom, a bromine atom, or an iodine atom, and a fluorine atom, a chlorine atom, and a bromine atom are preferred.

In the present embodiment, a salt of a stilbene-based compound represented by any of the above formulas refers to a state where a free acid of the stilbene-based compound represented by the formulas forms a salt together with an inorganic cation or an organic cation. Examples of the inorganic cation include cations of alkali metals such as lithium, sodium, and potassium, and ammonium ($NH_4^+$). Examples of the organic cation include an organic ammonium represented by a following formula (D).

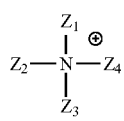
(D)

In the formula (D), $Z_1$ to $Z_4$ each independently represent a hydrogen atom, an alkyl group, a hydroxyalkyl group, or a hydroxyalkoxyalkyl group, and at least any one of $Z_1$ to $Z_4$ is a group that is not a hydrogen atom.

Specific examples of $Z_1$ to $Z_4$ in the formula (D) include: $C_1$-$C_6$ alkyl groups such as methyl, ethyl, butyl, pentyl, and hexyl, preferably $C_1$-$C_6$ alkyl groups;
hydroxy $C_1$-$C_6$ alkyl groups such as hydroxymethyl, 2-hydroxyethyl, 3-hydroxypropyl, 2-hydroxypropyl, 4-hydroxybutyl, 3-hydroxybutyl, and 2-hydroxybutyl, preferably hydroxy $C_1$-$C_4$ alkyl groups; and
hydroxy $C_1$-$C_6$ alkoxy $C_1$-$C_6$ alkyl groups such as hydroxyethoxymethyl, 2-hydroxyethoxyethyl, 3-hydroxyethoxypropyl, 3-hydroxyethoxybutyl, and 2-hydroxyethoxybutyl, preferably hydroxy $C_1$-$C_4$ alkoxy $C_1$-$C_4$ alkyl groups.

Among those inorganic cations and organic cations, cations of sodium, potassium, lithium, monoethanolamine, diethanolamine, triethanolamine, monoisopropanolamine, diisopropanolamine, triisopropanolamine, ammonium, and so forth are more preferred, and cations of lithium, ammonium, and sodium are particularly preferred.

Now, a method for synthesizing the stilbene-based compound according to the present embodiment will be described. A stilbene-based compound represented by any of the above formulas according to the present embodiment can be synthesized, for example, by performing a synthesis reaction shown in the following as a synthesis method.

The stilbene-based compound according to the present embodiment in which the group Y in the formula (1) is an amide group optionally having a substituent, for example, the stilbene-based compound represented by the formula (3), can be produced through common amidation using an acid chloride or an acid anhydride. Specifically, amidation of a compound including a stilbene backbone is performed. The stilbene-based compound of the present embodiment represented by the formula (3) can be synthesized as follows: for example, 4-amino-4'-nitrostilbene-2,2'-disulfonic acid, which is obtainable as a commercially available product, is first reacted with an acid chloride represented as A–C(=O)—Cl (wherein A is as defined for the formula (3)) or an acid anhydride represented as A–C(=O)—O-C(=O)—A (wherein A is as defined for the formula (3)) in an solvent such as N-methyl-2-pyrrolidone in the presence of a base such as sodium carbonate at 60° C. to 140° C.; water or saline is then added to the resulting reaction solution, and a solid precipitated is separated through filtration or the like; thereafter, the solid separated is washed and dried, as necessary.

The stilbene-based compound according to the present embodiment in which the group Y in the formula (1) is a naphthotriazole group optionally having a substituent, for example, the stilbene-based compound represented by the formula (5), can be also synthesized from 4-amino-4'-nitrostilbene-2,2'-disulfonic acid, which is obtainable as a commercially available product. Specifically, 4-amino-4'-nitrostilbene-2,2'-disulfonic acid in water is diazotized, for example, with an aqueous solution of sodium nitrite under an acidic condition with hydrochloric acid or the like at 10° C. or lower. Aminonaphthalene of a formula (A) below is then added to the resulting diazotized reaction solution, and this solution is reacted at pH 1.0 to 8.0 to obtain a compound of a formula (B) below as an intermediate. In the following formulas (A) and (B), a group $R^2$ and n are as defined for the formula (5).

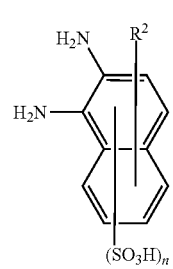
(A)

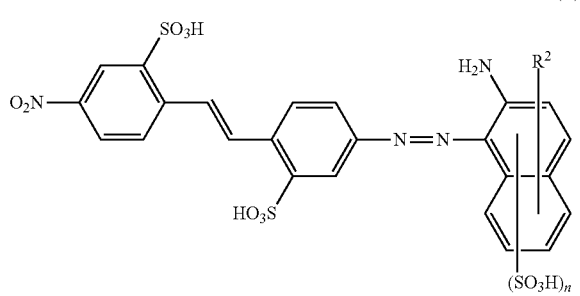
(B)

The resulting intermediate of the formula (B) in water is treated with a 25% aqueous solution of sodium hydroxide to obtain an aqueous solution at pH 9.0 to 11.0, and to this aqueous solution 28% aqueous ammonia and copper sulfate pentahydrate are added, and these are reacted at 80 to 100° C. Through the procedure, the stilbene-based compound represented by the formula (5) in which the group B is a nitro group can be obtained.

Further, the stilbene-based compound represented by a formula (C) with the group B being an amino group can be obtained by subjecting the stilbene compound obtained in which the group B is a nitro group, for example, to iron powder reduction, hydrazine reduction, or reduction reaction using a representative reducing agent such as palladium-carbon. In the following formula (C), a group $R^2$ and n are as defined for the formula (5).

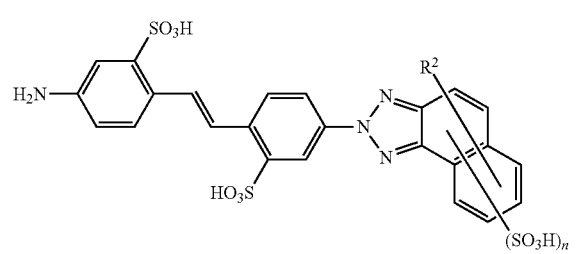
(C)

The amino group of the compound of the formula (C) obtained may be optionally converted, for example, into an alkylamino group, an alkylcarbonylamino group, an arylcarbonylamino group, an alkylsulfonylamino group, or an arylsulfonylamino group by using a conventional method.

The stilbene-based compound according to the present embodiment or a salt thereof obtained as described above is useful as a dichroic dye for polarizing films. Further, polarizing plates can be produced by providing a transparent protective film on a polarizing film. As necessary, various known functional layers may be additionally provided on a polarizing plate produced, and such a polarizing plate is applicable to liquid crystal projectors, calculators, clocks, laptop computers, word processors, liquid crystal televisions, car navigation systems, displays for security, measurement instruments for outdoor and indoor uses, indicators, lenses and glasses, and so forth.

Polarizing Film

The polarizing film according to the present embodiment includes a substrate containing a stilbene-based compound represented by any of the above formulas or a salt thereof, and is preferably a dye-containing polarizing film. Since the polarizing film contains the above-described stilbene-based compound or a salt thereof that exhibits polarized light-emitting action in the visible light region, the polarizing film has a polarized light-emitting function of emitting a polarized light in the visible light region. It is preferable that such a substrate be, for example, a film obtained by forming a film from a hydrophilic polymer capable of adsorbing a dye. The hydrophilic polymer is not limited to a particular hydrophilic polymer, and examples thereof include polyvinyl alcohol-based resins, amylose-based resins, starch-based resins, cellulosic resins, and polyacrylate-based resins. Among these resins, polyvinyl alcohol-based resins or derivatives thereof are preferred from the viewpoint of adsorbability for dyes, processability, orientation, and so forth, and it is preferable that the substrate be a film produced from a polyvinyl alcohol resin or a derivative thereof. The polyvinyl alcohol-based resin or derivative thereof may have been modified, for example, with an olefin such as ethylene and propylene, or an unsaturated carboxylic acid such as crotonic acid, acrylic acid, methacrylic acid, and maleic acid. The shape of the substrate is not limited to a particular shape, and the substrate may be produced into any shape such as shapes of a film, a sheet, a plate, a curved plate, and a hemisphere. The thickness of the substrate is typically 10 μm to 100 μm, and preferably 20 μm to 80 μm. The polarizing film may contain one or more of the stilbene-based compounds represented by the above formulas or salts thereof.

The blend ratio of the stilbene-based compound to be contained in the polarizing film is not limited to a particular blend ratio, but it is preferable that the blend ratio be adjusted so that the transmittance falls within a preferred range described later. The polarization performance of the polarizing film varies not only with the blend ratio of the stilbene-based compound contained in the polarizing film but also with various factors including the degree of swelling of the substrate for adsorption of the compound, and the stretch ratio, staining time, staining temperature, pH at staining, and influence of a salt. Hence, the blend ratio of the stilbene-based compound to be contained in the polarizing film can be determined in accordance with the degree of swelling of the substrate, temperature in staining, time, pH, the type of a salt, the concentration of a salt, and further the stretch ratio. The blend ratio may be appropriately adjusted.

The polarizing film according to the present embodiment may further contain one or more organic dyes or fluorescent dyes differing from the stilbene-based compounds represented by the above formulas or salts thereof, as necessary, for the purpose of color adjustment, in a range that does not inhibit the polarization performance of the polarizing film. The organic dye or fluorescent dye to be used in combination is not limited to a particular organic dye or fluorescent dye, but dyestuffs with high dichroism are preferred and dyes that have less influence on the polarization performance of the stilbene-based compounds represented by the above formulas or salts thereof in the ultraviolet light region are preferred. Examples of such dyes include C.I. Direct Yellow 12, C.I. Direct Yellow 28, C.I. Direct Yellow 44, C.I. Direct Orange 26, C.I. Direct Orange 39, C.I. Direct Orange 71, C.I. Direct Orange 107, C.I. Direct Red 2, C.I. Direct Red 31, C.I. Direct Red 79, C.I. Direct Red 81, C.I. Direct Red 247, C.I. Direct Blue 69, C.I. Direct Blue 78, C.I. Direct Green 80, and C.I. Direct Green 59. These dyes may be in the form of free acid, an alkali metal salt (e.g., an Na salt, a K salt, an Li salt), an ammonium salt, or a salt of amine.

If the organic dye or fluorescent dye is used in combination, the type of the dye to be blended varies in accordance with the use of a polarizing film desired, such as a polarizing film of neutral gray, a colored polarized film for liquid crystal projectors, and other colored polarized films. For this reason, the blend ratio of the organic dye or fluorescent dye is not limited to a particular blend ration, and, typically, it is preferable to use 0.01 to 10 parts by mass in total of at least one or more of those dyes based on the amount in parts by mass of a stilbene-based compound represented by any of the above formulas or a salt thereof.

Method for Producing Polarizing Film

Now, a method for producing the polarizing film according to the present embodiment will be described. The method for producing the polarizing film according to the present embodiment primarily includes: a step of preparing a substrate; a swelling step of soaking the substrate in a swelling liquid to stretch the substrate through swelling; a staining step of impregnating the swollen substrate with a staining solution containing at least one of the stilbene-based compounds represented by the above formulas or a salt thereof to allow the substrate to adsorb the stilbene-based compound as a dye; a crosslinking step of soaking the substrate containing the dye in a solution containing boric acid to crosslink the dye in the substrate; a stretching step of uniaxially stretching in a given direction the substrate with the dye crosslinked to arrange the dye in the given direction; and, as necessary, a washing step of washing the stretched substrate with a washing liquid and a drying step of drying the substrate washed, but is not limited to the mentioned production method.

Preparation of Substrate

First, a substrate to contain a stilbene-based compound represented by any of the above formulas (hereinafter, also referred to as the "dye", simply) is prepared. For example, a film of a commercially available polyvinyl alcohol-based resin or a derivative thereof may be used for the substrate, or the substrate may be produced by forming a film from a polyvinyl alcohol-based resin. The method for forming a film from a polyvinyl alcohol-based resin is not limited to a particular method, and any known film formation method may be employed, such as a method of melt-extruding a water-containing polyvinyl alcohol, a flow casting film formation method, a wet film formation method, a gel film formation method (an aqueous solution of polyvinyl alcohol is temporarily gelled by cooling, and the solvent is then removed through extraction), a casting film formation method (an aqueous solution of polyvinyl alcohol is flowed onto a base and dried), and a method with combination of any of them.

Swelling Step

Next, swelling treatment is performed for the above-described substrate. It is preferable that the swelling treatment be performed by soaking the substrate in a swelling liquid at 20 to 50° C. for 30 seconds to 10 minutes, and it is preferable that the swelling liquid be water. It is preferable to adjust the stretch ratio of the substrate with the swelling liquid to 1.00 to 1.50 times, and it is more preferable to adjust the stretch ratio to 1.10 to 1.35 times.

Staining Step

Subsequently, the substrate obtained through the swelling treatment as described above is allowed to adsorb at least one dye and be impregnated therewith. The staining step is not limited to a particular method and may be any method that allows a substrate to adsorb a dye and be impregnated therewith, but it is preferable, for example, to soak the substrate in a staining solution containing the dye (aqueous staining solution), and the substrate may be allowed to adsorb the staining solution by coating the substrate with the staining solution. The concentration of the dye in the staining solution is not limited to a particular concentration and may be any concentration that allows the substrate to sufficiently adsorb the dye therein, and it is preferable that the concentration of the dye in the staining solution be 0.0001 to 1% by mass, and it is more preferable that that the concentration of the dye in the staining solution be 0.001 to 0.5% by mass.

It is preferable that the temperature of the staining solution in the staining step be 5 to 80° C., it is more preferable that the temperature of the staining solution in the staining step be 20 to 50° C., and it is particularly preferable that the temperature of the staining solution in the staining step be 40 to 50° C. The time for soaking of the substrate in the staining solution can be appropriately controlled, and it is preferable to control the time to 30 seconds to 20 minutes, and it is more preferable to control the time to 1 to 10 minutes.

One of the stilbene-based compounds represented by the above formulas may be used singly as the dye to be contained in the staining solution, and two or more thereof may be used in combination. Emission color differs among the stilbene-based compounds represented by the above formulas, and hence emission color to be generated can be appropriately adjusted to a desired color through inclusion of one or more of the dyes in the substrate. As necessary, the staining solution may further contain one or more of the organic dyes or fluorescent dyes.

In addition to the above dyes, the staining solution may further contain a staining aid, as necessary. Examples of the staining aid include sodium carbonate, sodium hydrogen carbonate, sodium chloride, sodium sulfate (mirabilite), anhydrous sodium sulfate, and sodium tripolyphosphate, and the staining aid is preferably sodium sulfate. The content of the staining aid can be optionally adjusted through the time for the soaking and the temperature of the staining solution based on the staining properties of the dye to be used, but it is preferable that the content of the staining aid in the staining solution be 0.1 to 10% by mass, and it is more preferable that the content of the staining aid in the staining solution be 0.1 to 2% by mass.

After the staining step, a pre-washing step may be optionally performed to remove the staining solution that adhered to the surface of the substrate after the dye inclusion step. By performing the pre-washing step, migration of the dye remaining on the surface of the substrate into a liquid for the next treatment can be inhibited. In the pre-washing step, water is typically used as a washing liquid. It is preferable as a washing method to soak the stained substrate in the washing liquid, and alternatively the substrate can be washed by coating the substrate with the washing liquid. The washing time is not limited to a particular time, and is preferably 1 to 300 seconds, and more preferably 1 to 60 seconds. The temperature of the washing liquid in the pre-washing step is required to be a temperature at which the material forming the substrate is not dissolved, and washing treatment is performed at 5 to 40° C. in typical cases. The performance of a polarizer is not largely affected by the absence of the pre-washing step, and hence the pre-washing step may be even omitted.

Crosslinking step

After the dye inclusion step or the pre-washing step, the substrate can be allowed to contain a crosslinking agent. It is preferable as a method for allowing the substrate to contain a crosslinking agent to soak the substrate in a treatment solution containing a crosslinking agent, and alternatively the substrate may be coated with the treatment solution or the treatment solution may be applied to the substrate. It is preferable to use a solution containing boric acid as the crosslinking agent in the treatment solution. The solvent in the treatment solution is not limited to a particular solvent, but water is preferred. It is preferable that the concentration of boric acid in the treatment solution be 0.1 to 15% by mass, and it is more preferable that the concentration of boric acid in the treatment solution be 0.1 to 10% by mass. It is preferable that the temperature of the treatment solution be 30 to 80° C., and it is more preferable that the temperature of the treatment solution be 40 to 75° C. It is preferable that the treatment time in the crosslinking step be 30 seconds to 10 minutes, and it is more preferable that the treatment time in the crosslinking step be 1 to 6 minutes. By the crosslinking step included in the method for producing the polarizing film according to the present embodiment, a polarizer to be obtained exhibits high contrast. This is an excellent action completely unpredictable from the function of boric acid, which has been used in conventional techniques for the purpose of improving moisture resistance or light transmittance. In the crosslinking step, fixing treatment may be further performed, as necessary, concomitantly by using an aqueous solution containing a cationic polymer compound. The fixing treatment allows fixation of the dye. The cationic polymer compound to be used at this time is, for example, a polycondensation product of dicyanamide and formalin as a dicyan-based compound; a dicyandiamide-diethylenetriamine polycondensation product as a polyamine-based compound; or an epichlorohydrin-dimethylamine addition polymerization product, dimethyldiallylammonium chloride-dioxide ion copolymer, a diallylamine salt polymer, a dimethyldiallylammonium chloride polymer, a polymer of an allylamine salt, or a dialkylaminoethyl acrylate quaternary salt polymer as a polycationic compound.

Stretching Step

After performing the crosslinking step, a stretching step is performed. The stretching step is performed by uniaxially stretching the substrate in a given direction. The stretching method may be either wet stretching or dry stretching. It is preferable that the stretch ratio be three times or more, and the stretch ratio is more preferably five to eight times.

If the hot-stretching medium in dry stretching is an air medium, it is preferable to stretch the substrate with the temperature of the air medium set to normal temperature to 180° C. It is preferable to stretch the substrate in an atmosphere with a humidity of 20 to 95%RH. Examples of methods for heating the substrate include inter-roll zone stretching, roll heating stretching, hot rolling stretching, and infrared heating stretching, but are not limited to these stretching methods. The dry stretching step may be performed in one-stage stretching or multistage stretching with two or more stages.

It is preferable in wet stretching to stretch the substrate in water, a water-soluble organic solvent, or a mixed solution thereof. More preferably, stretching treatment is performed with the substrate soaked in a solution containing at least one crosslinking agent. For the crosslinking agent, for example, boric acid to be used in the crosslinking step may be used, and stretching treatment can be preferably performed in the treatment solution used in the crosslinking step. It is preferable that the stretching temperature be 40 to 60° C., and it is more preferable that the stretching temperature be 45 to 58° C. The stretching time is typically 30 seconds to 20 minutes, and preferably 2 to 7 minutes. The wet stretching step may be performed in one-stage stretching or multistage stretching with two or more stages. The stretching treatment may be optionally performed before the dye inclusion step, and in this case orientation of the dye may be performed simultaneously at the time of staining.

Washing Step

After performing the stretching step, a precipitate of the crosslinking agent or a foreign substance is adhering to the surface of the substrate in some cases, and hence a washing step to wash the surface of the substrate may be performed. It is preferable that the washing time be 1 second to 5 minutes. It is preferable as a washing method to soak the substrate in a washing liquid, and alternatively the substrate can be washed by coating the substrate with the washing liquid or applying the washing liquid to the substrate. Water is preferred as the washing liquid. The washing treatment may be performed in one stage or as multistage treatment with two or more stages. The temperature of the washing liquid in the washing step is not limited to a particular temperature, but typically 5 to 50° C., preferably 10 to 40° C., and may be normal temperature.

Examples of the solvent of the solution or treatment liquid to be used in each step other than water as described above include dimethyl sulfoxide, N-methylpyrrolidone, alcohols such as methanol, ethanol, propanol, isopropyl alcohol, glycerin, ethylene glycol, propylene glycol, diethylene glycol, triethylene glycol, tetraethylene glycol, and trimethylolpropane; and amines such as ethylenediamine and diethylenetriamine. The solvent of each solution or treatment liquid is not limited to these, but the most preferably water. One single solvent or a mixture of two or more solvents may be used for the solvent of each solution or treatment liquid.

Drying Step

After the washing step, a drying step for the substrate is performed. Drying treatment can be performed by using natural drying; to increase the drying efficiency to a higher degree, however, drying treatment can be performed, for example, by using compression with rolls or moisture removal for the surface with an air knife, a water-absorbing roll, or the like, and moreover blow drying can be performed. It is preferable that the temperature for the drying treatment be 20 to 100° C., and it is more preferable that the temperature for the drying treatment be 60 to 100° C. It is preferable that the drying time be 30 seconds to 20 minutes, and it is more preferable that the drying time be 5 to 10 minutes.

The polarizing film according to the present embodiment can be produced in the above-described manner. Polarizing films of various colors or neutral gray can be produced by orienting a stilbene-based compound represented by any of the above formulas in the present embodiment with a method of orienting by mixing with a liquid crystal or an application method for sharing.

Polarizing Plate

The polarizing plate according to the present embodiment includes: the above-described polarizing film; and a transparent protective layer provided on at least one surface of the polarizing film, and is preferably a dye-containing polarizing plate. The transparent protective layer is used to enhance the water resistance, handleability, and so forth of the polarizing film. Accordingly, the transparent protective layer as such has no influence on the polarizing action that the polarizing film according to the present embodiment exhibits.

It is preferable that the transparent protective layer be a transparent protective film superior in optical transparency and mechanical strength. It is preferable that the transparent protective layer be a film having the shape of a layer capable of retaining the shape of the polarizing film, and it is preferable that the transparent protective layer be a plastic film superior in thermal stability, moisture shielding, and so forth, as well as transparency and mechanical strength. Because the polarizing film absorbs lights in the ultraviolet light region and exhibits polarized light-emitting action, it is preferable that the transparent protective layer have no ultraviolet light-absorbing function, and in particular it is preferable that the transparent protective layer be a plastic film having no ultraviolet light-absorbing function. Examples of materials to form such a transparent protective film include cellulose acetate-based films, acrylic films, fluorine-containing films such as ethylene tetrafluoride/propylene hexafluoride copolymer, and films of polyester resin, polyolefin resin, or polyamide-based resin, and a triacetylcellulose (TAC) film or a cycloolefin-based film is preferably used. It is preferable that the thickness of the transparent protective layer be in the range of 1 μm to 200 μm, it is more preferable that the thickness of the transparent protective layer be in the range of 10 μm to 150 μm, and it is particularly preferable that the thickness of the transparent protective layer be in the range of 40 μm to 100 μm. The method for producing the polarizing plate according to the present embodiment is not limited to a particular method, and, for example, the polarizing plate can be produced by stacking the transparent protective layer on the polarizing film and laminating the resultant by using a known procedure.

The polarizing plate may further include an adhesive layer between the transparent protective layer and the polarizing film to bond the transparent protective layer to the polarizing film. The adhesive forming the adhesive layer is not limited to a particular adhesive, and examples thereof include polyvinyl alcohol-based adhesives, urethane emulsion-based adhesives, acrylic adhesives, and polyester-isocyanate-based adhesives, and a polyvinyl alcohol-based adhesive is preferably used. The polarizing plate can be produced by bonding the transparent protective layer and the polarizing film together with an adhesive followed by performing drying or heat treatment at an appropriate temperature.

The polarizing plate according to the present embodiment may appropriately include any of various known functional layers such as an antireflection layer, an antiglare layer, and an additional transparent protective layer on the exposed surface of the transparent protective layer. In forming a layer having such a functionality, a method of applying a material having any functionality to the exposed surface of the transparent protective layer is preferred, and alternatively a layer or film having such a function may be bonded to the exposed surface of the transparent protective layer via an adhesive or a pressure-sensitive adhesive.

Examples of the additional transparent protective layer include acrylic or polysiloxane-based hardcoat layers and urethane-based protective layers. An antireflection layer may be provided on the exposed face of the transparent protective layer to further enhance the single transmittance. The antireflection layer can be formed through vapor deposition or sputtering treatment with a substance such as silicon dioxide and titanium oxide on the transparent protective layer, or thinly coating the transparent protective layer with a fluorine-containing substance.

The polarizing plate according to the present embodiment may be further provided with a transparent support or the like of glass, quartz, sapphire, or the like, as necessary. It is preferable that the support have a flat portion for bonding to the polarizing plate, and it is preferable for optical applications that the support be a transparent basal plate. Transparent basal plates are classified into inorganic basal plates and organic basal plates, and examples of inorganic groups include soda-lime glass sheets, borosilicate glass sheets, quartz basal plates, sapphire basal plates, and spinel basal plates, and examples of organic basal plates include basal plates composed of acrylic, polycarbonate, polyethylene terephthalate, polyethylene naphthalate, or cycloolefin polymer. The thickness, size, and so forth of the transparent basal plate are not limited to particular values, and may be appropriately determined. In order to enhance the single transmittance to a higher degree, it is preferable to provide the polarizing plate including such a transparent basal plate with an antireflection layer on the surface of the support or on one or each surface of the polarizing plate. In order to adhere the polarizing plate onto the flat portion of the support, the flat portion of the support can be coated with a transparent adhesive (pressure-sensitive adhesive) and then the polarizing plate according to the present embodiment can be attached onto the coated surface. The adhesive or pressure-sensitive adhesive to be used is not limited to a particular adhesive or pressure-sensitive adhesive, and commercially available products can be used, and acrylate-based adhesives or pressure-sensitive adhesives are preferred.

Moreover, a retardation plate may be attached onto the polarizing plate according to the present embodiment to use the polarizing plate as a circularly polarizing plate or an elliptically polarizing plate. If the polarizing plate is further provided with a support or the like in this case, the support may be provided in the retardation plate side or the polarizing plate side. As described above, the polarizing plate may be further provided with various functional layers, supports, and so forth, and such polarizing plates can be used for various products including liquid crystal projectors, calculators, clocks, laptop computers, word processors, liquid crystal televisions, car navigation systems, measurement instruments and indicators for outdoor and indoor uses, lenses, and glasses.

The polarizing film and polarizing plate according to the present embodiment, produced in the described manner, each exhibit a high degree of polarization in the ultraviolet light region, and in addition exhibit polarized light-emitting action and high transmittance in the visible light region. The polarizing film and polarizing plate according to the present embodiment each exhibit superior durability against heat, humidity, light, and so forth, and hence are each capable of retaining the performance even in severe environments, and have higher durability than conventional iodine-containing polarizing plates. For this reason, the polarizing film and polarizing plate according to the present embodiment can be applied to various display devices for liquid displays requiring high transmittance in the visible light region and high durability in severe environments, such as televisions, wearable devices, tablet devices, smartphones, monitors for automotive application, digital signage systems for outdoor and indoor uses, and smart windows.

Display Device

The display device according to the present embodiment includes the above polarizing film or polarizing plate. It follows that a display including the polarizing film or polarizing plate containing a specific stilbene-based compound in the present embodiment exhibits polarized light-emitting action on being irradiated with light of 400 nm or shorter, for example, ultraviolet light, and can display by using the action. The display device according to the present embodiment has high transmittance in the visible light region, and hence lowering of the transmittance in the visible light region as found for conventional polarizing plates is avoided, or even if lowering of the transmittance occurs, the lowering is significantly smaller than those of conventional polarizing plates. For iodine-containing polarizing plates, which are conventional polarizing plates, and dye-containing polarizing plates using any other dye compound, for example, the luminous efficiency correction in the visible light region in order to set the degree of polarization to nearly 100% is around 35 to 43%. The reason is that conventional polarizing plates, which have both a vertical axis and a horizontal axis as absorption axes for light, absorb incident light in either one of the vertical axis and the horizontal axis in order to achieve a degree of polarization of nearly 100%, more specifically, absorb light in one axis and transmit light in the other axis to generate polarized light. In such a case, light in one axis is absorbed and not transmitted, inevitably lowering the transmittance to 50% or lower. Conventional polarizing plates are produced by orienting a dichroic dyestuff in a stretched film, but the dichroic dyestuff is not completely oriented, and a degree of polarization of nearly 100% cannot be achieved without a transmittance of about 43% or lower caused by the surface reflection of a substance, because of the presence of certain amounts of absorbing components even in the transmission axis for light; in short, a high degree of polarization cannot be achieved without lowering of the transmittance. The polarizing film or polarizing plate according to the present embodiment, by contrast, has an absorption axis for light around about 400 nm. Such a polarizing film or polarizing plate has light-absorbing action in the ultraviolet light region and exhibits polarized light-emitting action to emit polarized light in the visible light region, and on the other hand hardly absorbs light in the visible light region, and hence the transmittance in the visible light region is very high. In addition, because of exhibition of the polarized light-emitting action in the visible light region, loss of light is less than in using conventional polarizing plates, and lowering of the transmittance as found for conventional polarizing plates is very small. From this point, display devices, for example, liquid crystal displays using the polarizing film or polarizing plate according to the present embodiment provide higher brightness than liquid crystal displays using any of conventional polarizing plates. Further, the display device including the polarizing film or polarizing plate according to the present embodiment has high transparency, and thus can provide nearly transparent displays despite being liquid crystal displays, and by the capability of being designed to transmit polarized light emission in displaying characters, images, and so forth, can provide displays capable of displaying despite being transparent liquid crystal displays, that is, displays capable of displaying characters and so forth on a transparent display. For this reason, the display device according to the present embodiment is effective for application to transparent liquid crystal displays without light loss, in particular, to see-through displays.

Alternatively, the display device according to the present embodiment can be applied to liquid crystal displays capable of displaying with ultraviolet light because of the capability of polarizing with ultraviolet light invisible to humans. Simple liquid crystal displays with high security can be produced, such that such images and so forth displayed in the ultraviolet light region are recognized with a computer or the like to make the images and so forth visible only on being irradiated with ultraviolet light.

The display device according to the present embodiment enables, for example, production of liquid crystal displays that exhibit polarized light-emitting action by irradiation with ultraviolet light and utilize the polarized light emission. Thus, the display device according to the present embodiment enables achievement of liquid crystal displays using ultraviolet light, in contrast to normal liquid crystal displays using visible light. That is, the display device according to the present embodiment enables production of self-emitting liquid crystal displays on which characters, images, and so forth to be displayed are displayed even in a dark space without any light as long as the space allows irradiation with ultraviolet light.

In addition, displays capable of displaying in two different manners involving coexistence of a liquid crystal displaying site capable of displaying with light in the visible light region and a liquid crystal displaying site with light displayed through polarized light-emitting action caused by ultraviolet light can be produced because a light absorption band in the visible light region and that in the ultraviolet light region are different. There currently exist displays capable of displaying in two different manners; however, there exists no display capable of displaying in different manners even on the same display panel with different light sources, a light source in the ultraviolet light region and that in the visible light region. From this viewpoint, the display device according to the present embodiment enables production of a novel display by virtue of the above polarizing film or polarizing plate included therein.

Liquid crystal cells to be used for liquid crystal displays for automotive application or outdoor display using the polarizing film or polarizing plate according to the present embodiment are not limited to TN liquid crystals, STN liquid crystals, VA liquid crystals, IPS liquid crystals, and so forth, and such liquid crystal displays can be used in any liquid crystal display mode.

Neutral gray polarizing plates for automotive application or outdoor display using the polarizing plate according to the present embodiment are superior in polarization performance, and, moreover, can reduce discoloration and lowering of polarization performance even in high temperature or high humidity condition in an automobile or outdoor environment. Thus, the polarizing plate according to the present embodiment can contribute to enhancement of long-term reliability of liquid crystal displays for automotive application or outdoor display.

Examples

Hereinafter, the present disclosure will be described in more detail with reference to Examples; however, these are only exemplary and not limit the present disclosure in any way. "%" and "part" shown in the following description are based on mass unless specifically stated. For compounds subjected to measurement of λmax (maximum absorption wavelength) among compounds synthesized, measurements in an aqueous solution at pH7 to 8 are shown. Acidic groups such as a sulfo group in structural formulas of compounds used in Examples and Comparative Examples are each illustrated in the form of free acid.

Example 1

Synthesis Example 1

To 30 parts of N-methyl-2-pyrrolidone, 4.0 parts of a commercially available product of 4-amino-4'-nitrostilbene-2,2'-disulfonic acid and 2.8 parts of sodium carbonate were added, to which 3.4 parts of 4-methoxybenzoyl chloride was then added dropwise over 5 minutes. Thereafter, the resulting solution was stirred at 110° C. for 6 hours. Then, 100 parts of water was added to the resulting reaction solution, and a solid precipitated was separated through filtration, and further washed with 100 parts of acetone to obtain 10.0 parts of a wet cake. This wet cake was dried with a hot-air dryer at 80° C., and thus 3.0 parts of a stilbene-based compound according to the present disclosure represented by a following formula (7) was synthesized (λmax: 370 nm).

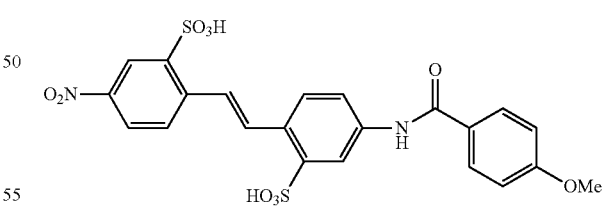

(7)

Production of Polarizing Film And Polarizing Plate)

A polyvinyl alcohol film of 75 μm in thickness (VF-PS #7500 produced by Kuraray Co., Ltd.) was soaked in water at 40° C. for 3 minutes to swell the film. The film obtained through swelling was soaked in an aqueous solution containing 1.0 part of the stilbene-based compound of the formula (7) obtained in Synthesis Example 1, 1.0 part of mirabilite, and 1000 parts of water at 45° C. for 4 minutes to allow the film to contain the stilbene-based compound of the formula (7). The film containing the stilbene-based compound of the formula (7) was soaked in a 3% aqueous solution of boric acid at 50° C. for 5 minutes to stretch 5 times. The stretched film with the tense state kept was washed with water at normal temperature for 20 seconds and then dried, and thus a polarizing film was produced. A triacetylcellulose film without any ultraviolet absorber (ZRD-60 produced by FUJIFILM Corporation) (thickness: 60 μm) was laminated on each side of the obtained polarizing film by using a known procedure, and thus a polarizing plate according to the present disclosure was produced. This polarizing plate was used as a measurement sample of Example 1.

Example 2

Synthesis Example 2

The same operations as in Synthesis Example 1 were performed except that 4.0 parts of 4-nitrobenzoyl chloride was used instead of 3.4 parts of 4-methoxybenzoyl chloride in Synthesis Example 1 to synthesize 3.2 parts of a stilbene-based compound according to the present disclosure represented by a formula (8) below (λmax: 373 nm). Then, a polarizing film and polarizing plate were produced by using the stilbene-based compound represented by the formula (8) in the same manner as in Example 1, and thus a polarizing plate according to the present disclosure was produced. This polarizing plate was used as a measurement sample of Example 2.

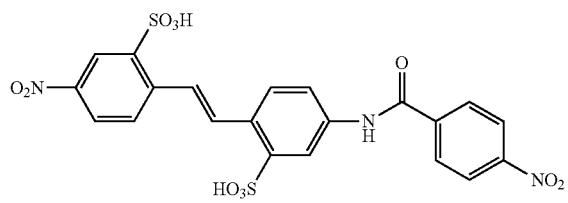

(8)

Example 3

Synthesis Example 3

To 300 parts of water, 35.2 parts of a commercially available product of 4-amino-4'-nitrostilbene-2,2'-disulfonic acid was added, and the resultant was stirred and the pH was adjusted to 0.5 with 35% hydrochloric acid. To the resulting solution, 10.9 parts of a 40% aqueous solution of sodium nitrite was added, and the resultant was stirred at 10° C. for 1 hour. Then, 17.2 parts of 6-aminonaphthalene-2-sulfonic acid was added to the diazotized solution, and the pH was further adjusted to 4.0 with a 15% aqueous solution of sodium carbonate, and thereafter the solution was stirred for 4 hours. To the resulting reaction solution, 60 parts of sodium chloride was added, and a solid precipitated was separated through filtration, and further washed with 100 parts of acetone to obtain 124.0 parts of a wet cake of a compound of a formula (9) as an intermediate.

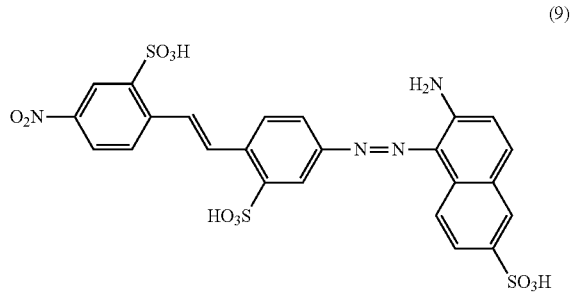 [SMILES: Nc1ccc2cc(S(=O)(=O)O)ccc2c1N=Nc1ccc(/C=C/c2ccc([N+](=O)[O-])cc2S(=O)(=O)O)c(S(=O)(=O)O)c1]

(9)

To 300 parts of water, 62.3 parts of the intermediate of the formula (9) obtained was added, and the resultant was stirred, and the pH was adjusted to 10.0 with a 25% aqueous solution of sodium hydroxide. To the resulting solution, 20 parts of 28% aqueous ammonia and 9.0 parts of copper sulfate pentahydrate were added, and the resultant was stirred at 90° C. for 2 hours. To the resulting reaction solution, 25 parts of sodium chloride was added, and a solid precipitated was separated through filtration, and further washed with 100 parts of acetone to obtain 40.0 parts of a wet cake of a compound of a formula (10). This wet cake was dried with a hot-air dryer at 80° C., and thus 20.0 parts of the compound represented by the following formula (10) (λmax: 376 nm) was synthesized.

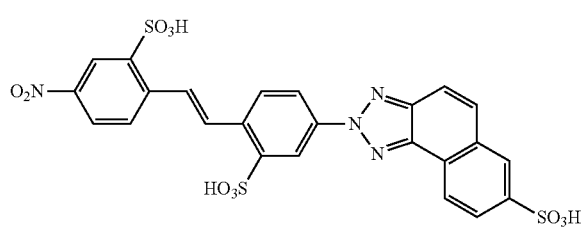

(10)

Production of Polarizing Film and Polarizing Plate

A polyvinyl alcohol film of 75 μm in thickness (VF-PS #7500 produced by Kuraray Co., Ltd.) was soaked in water at 40° C. for 3 minutes to swell the film. The film obtained through swelling was soaked in an aqueous solution containing 1.0 part of the stilbene-based compound of the formula (10) obtained in Synthesis Example 3, 1.0 part of mirabilite, and 1000 parts of water at 45° C. for 4 minutes to allow the film to contain the stilbene-based compound of the formula (10). The film containing the stilbene-based compound of the formula (10) was soaked in a 3% aqueous solution of boric acid at 50° C. for 5 minutes to stretch 5 times. The stretched film with the tense state kept was washed with water at normal temperature for 20 seconds and then dried, and thus a polarizing film was produced. A triacetylcellulose film without any ultraviolet absorber (ZRD-60 produced by FUJIFILM Corporation) was laminated on each side of the obtained polarizing film by using a known procedure, and thus a polarizing plate was produced. This polarizing plate was used as a measurement sample of Example 3.

Example 4

Synthesis Example 4

To 50 parts of N-methyl-2-pyrrolidone, 6.0 parts of a compound of a formula (11) below synthesized by using a method described in International Publication No. WO 2005/033211 and 1.6 parts of potassium carbonate were added, and the resultant was stirred. To the resulting solution, 2.1 parts of 4-methoxybenzoyl chloride was added, and the resultant was stirred at 90° C. for 4 hours. The resulting reaction solution was added to 300 parts of a 20% aqueous solution of sodium chloride, and a solid precipitated was separated through filtration, and further washed with 100 parts of acetone to obtain 20.0 parts of a wet cake of a compound of a formula (12). This wet cake was dried with a hot-air dryer at 80° C. to obtain 5.0 parts of the compound represented by the following formula (12) (λmax: 372 nm).

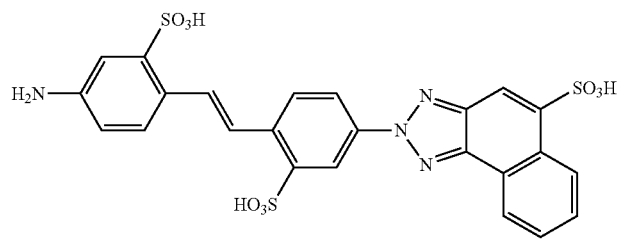

(11)

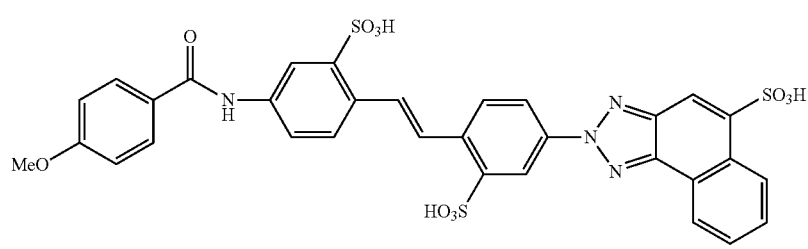

(12)

Production of Polarizing Film And Polarizing Plate

A polarizing film and a polarizing plate were produced in the same manner as in Example 3 except that the stilbene-based compound represented by the formula (12) was used instead of the stilbene-based compound represented by the formula (10) for the polarizing film produced in Example 3. This polarizing plate was used as a measurement sample of Example 4.

Example 5

Synthesis Example 5

With reference to Japanese Patent Publication No. S50-033814 and Japanese Patent Publication No. H03-294598, 0.20 parts of LEOCOL TD90 (surfactant), a product name, produced by Lion Corporation was added to 400 parts of iced water, and the resultant was vigorously stirred, into which 18.4 parts of cyanuric chloride was added, and the resultant was stirred at 0 to 5° C. for 30 minutes to obtain a suspension. Next, 25.3 parts of aniline-2,5-disulfonic acid was added to the suspension, and the resultant was stirred at pH 4 to 6 and 0 to 30° C. for 4 hours, to which 18.5 parts of 4,4'-diaminostilbene-2,2'-disulfonic acid was subsequently added, and the resultant was stirred at pH 4 to 8 and 20 to 50° C. for 6 hours. To the resulting reaction solution, 11 parts of diethanolamine was added, and the resultant was stirred at pH 8 to 10 and 40 to 70° C. for 6 hours, to which 80 parts of sodium chloride was then added, and a solid precipitated was separated through filtration, and further washed with 100 parts of acetone to obtain 100.0 parts of a wet cake. This wet cake was dried with a hot-air dryer at 80° C. to obtain 30.0 parts of a compound represented by a following formula (13) (λmax: 370 nm).

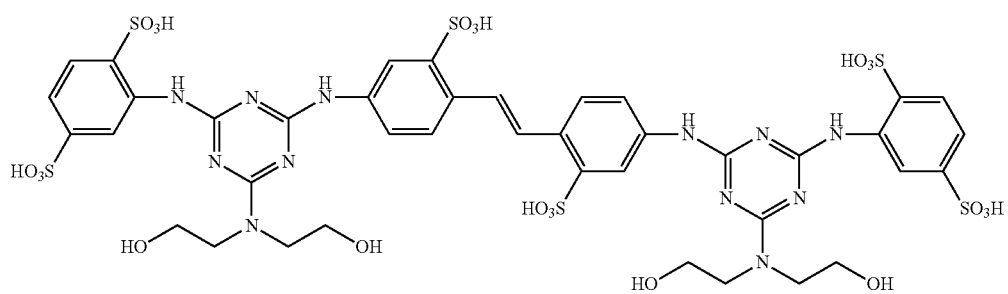

(13)

Production of Polarizing Film and Polarizing Plate

A polarizing film and a polarizing plate were produced in the same manner as in Example 1 except that the compound of the formula (13) was used instead of the compound of the formula (7) for the polarizing film produced in Example 1, and thus a polarizing plate according to the present disclosure was produced. This polarizing plate was used as a measurement sample of Example 5.

Example 6

Synthesis Example 6

By using the same method as in Synthesis Example 5 except that 25.3 parts of aniline-2,5-disulfonic acid used in Synthesis Example 5 was replaced with 17.3 parts of 4-aminobenzenesulfonic acid, 23.0 parts of a compound represented by a following formula (14) ($\lambda$max: 370 nm) was obtained.

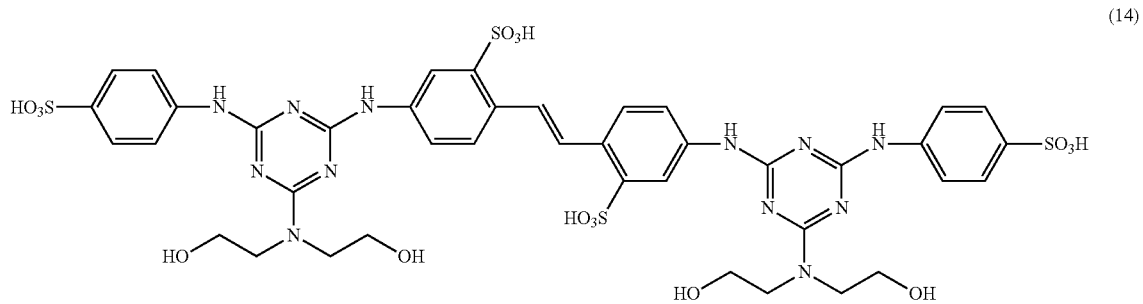 [SMILES: O=S(=O)(O)c1ccc(Nc2nc(Nc3ccc(/C=C/c4ccc(Nc5nc(Nc6ccc(S(=O)(=O)O)cc6)nc(N(CCO)CCO)n5)cc4S(=O)(=O)O)c(S(=O)(=O)O)c3)nc(N(CCO)CCO)n2)cc1]

(14)

Production of Polarizing Film And Polarizing Plate

A polarizing film and a polarizing plate were produced in the same manner as in Example 1 except that the compound of the formula (14) was used instead of the compound of the formula (7) for the polarizing film produced in Example 1, and thus a polarizing plate according to the present disclosure was produced. This polarizing plate was used as a measurement sample of Example 6.

Example 7

Synthesis Example 7 )

By using the same method as in Synthesis Example 5 except that 11 parts of diethanolamine used in Synthesis Example 5 was replaced with 18.8 parts of phenol, 15.0 parts of a compound represented by a following formula (15) ($\lambda$max: 370 nm) was obtained.

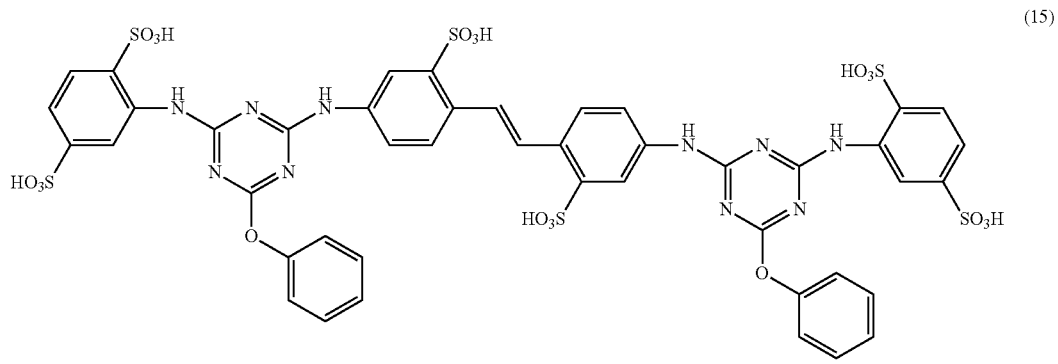 [SMILES: O=S(=O)(O)c1ccc(S(=O)(=O)O)c(Nc2nc(Nc3ccc(/C=C/c4ccc(Nc5nc(Nc6cc(S(=O)(=O)O)ccc6S(=O)(=O)O)nc(Oc6ccccc6)n5)cc4S(=O)(=O)O)c(S(=O)(=O)O)c3)nc(Oc3ccccc3)n2)c1]

(15)

Production of Polarizing Film and Polarizing Plate

A polarizing film and a polarizing plate were produced in the same manner as in Example 1 except that the compound of the formula (15) was used instead of the compound of the formula (7) for the polarizing film produced in Example 1, and thus a polarizing plate according to the present disclosure was produced. This polarizing plate was used as a measurement sample of Example 7.

Example 8

Synthesis Example 8

By using the same method as in Synthesis Example 5 except that 25.3 parts of aniline-2,5-disulfonic acid used in Synthesis Example 5 was replaced with 17.2 parts of 4-aminobenzenesulfonic acid amide, 23.0 parts of a compound represented by a following formula (16) ($\lambda$max: 370 nm) was obtained.

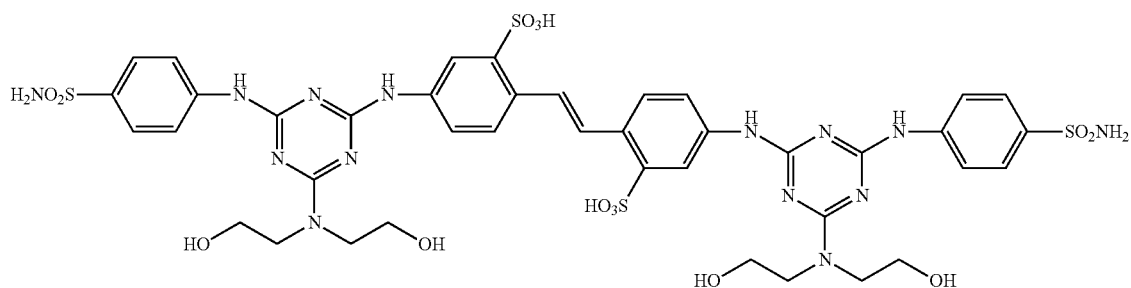

(16)

Production of Polarizing Film And Polarizing Plate

A polarizing film and a polarizing plate were produced in the same manner as in Example 1 except that the compound of the formula (16) was used instead of the compound of the formula (7) for the polarizing film produced in Example 1, and thus a polarizing plate according to the present disclosure was produced. This polarizing plate was used as a measurement sample of Example 8.

Comparative Example 1

A polarizing film and a polarizing plate were produced in the same manner as in Example 1 except that C.I. Direct Yellow 4 represented by a formula (17) below was used instead of the compound of the formula (7) for the polarizing film produced in Example 1. This polarizing plate was used as a measurement sample of Comparative Example 1.

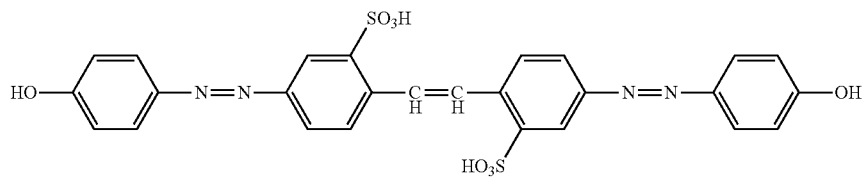

(17)

Comparative Example 2

A polarizing film and a polarizing plate were produced in the same manner as in Example 1 except that C.I. Direct Yellow 44 represented by a formula (18) below was used instead of the compound of the formula (7) for the polarizing film produced in Example 1. This polarizing plate was used as a measurement sample of Comparative Example 2.

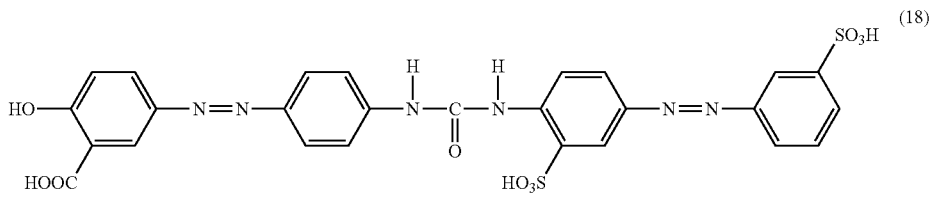 [SMILES: O=C(Nc1ccc(N=Nc2ccc(O)c(C(=O)O)c2)cc1)Nc1ccc(N=Nc2cccc(S(=O)(=O)O)c2)cc1S(=O)(=O)O]

(18)

Comparative Example 3

A polarizing film and a polarizing plate were produced in the same manner as in Example 1 except that a compound represented by a formula (19) below was used instead of the compound of the formula (7) for the polarizing film produced in Example 1. This polarizing plate was used as a measurement sample of Comparative Example 3.

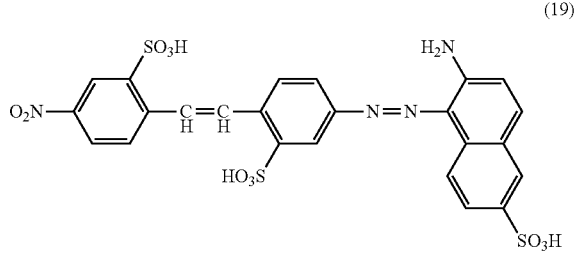 [SMILES: Nc1ccc2cc(S(=O)(=O)O)ccc2c1N=Nc1ccc(C=Cc2ccc([N+](=O)[O-])cc2S(=O)(=O)O)c(S(=O)(=O)O)c1]

(19)

Evaluation

Evaluation of the measurement samples obtained in Examples 1 to 8 and Comparative Examples 1 to 3 was performed in the following manner.

(a) Single transmittance Ts, parallel transmittance Tp, and cross transmittance Tc The single transmittance Ts, parallel transmittance Tp, and cross transmittance Tc, of each measurement sample were measured by using a spectrometer "U-4100" produced by Hitachi, Ltd.). Single transmittance Ts is transmittance at a given wavelength when one sheet of a measurement sample is subjected to measurement. Parallel transmittance Tp is spectral transmittance at a given wavelength when the same two sheets of a measurement sample obtained in any of Examples and Comparative Examples are prepared and subjected to measurement in such a manner that the two sheets of the measurement sample are overlaid on each other so that the absorption axes are in parallel with each other. Cross transmittance Tc is spectral transmittance measured in such a manner that two sheets of a measurement sample are overlaid on each other so that the absorption axes are perpendicular to each other. Measurement of each transmittance was performed over a wavelength band of 220 to 780 nm.

(b) Degree of polarization, ρ

The degree of polarization, ρ, of each measurement sample was calculated by substituting parallel transmittance Tp and cross transmittance Tc into an expression (I) below. As a value of ρ is higher, the value indicates a superior degree of polarization.

$$\rho = \{(Tp-Tc)/(Tp+Tc)\}^{1/2} \times 100 \qquad \text{[Expression (I)]}$$

(c) Luminous Efficiency Corrected Single Transmittance Ys

The luminous efficiency corrected single transmittance Ys of a measurement sample is transmittance obtained by correcting single transmittances Ts, determined at given wavelength intervals dλ, (here, 5-nm intervals) in a wavelength region of 400 to 700 nm in the visible light region with respect to luminous efficiency in accordance with JIS Z 8722: 2009. Specifically, calculation was made by substituting the single transmittances Ts into an expression below. In the following expression (II), Pλ, represents the spectral distribution of a standard light (light source C), and yλ, represents a color-matching function with a 2-degree field of view.

$$Ys (\%) = \frac{\int_{400}^{700} P\lambda \cdot y\lambda \cdot Ts \cdot d\lambda}{\int_{400}^{700} P\lambda \cdot y\lambda \cdot d\lambda} \qquad \text{[Expression (II)]}$$

(d) Measurement of Polarized Light Emission

A hand light-type black light with a 375 nm ultraviolet LED ("PW-UV943H-04" produced by NICHIA CORPORATION) was used as a light source, and an ultraviolet-transmitting/visible light-cut filter ("IUV-340" produced by Isuzu Glass Ltd.) was attached to the light source to cut visible light. In this setting, a polarizing plate ("SKN-18043P" produced by Polatechno Co., Ltd., thickness: 180 μm, Ys: 43%) to provide polarized light in the visible light region and ultraviolet light region and a measurement sample produced in any of Examples and Comparative Examples were set, and polarized light emission from the measurement sample was measured by using a spectroradiometer ("USR-40" produced by USHIO INC.) (hereinafter, referred to as "the polarizing plate for measurement"). Thus, measurement was performed with such a configuration that light from the light source passed through the ultraviolet-transmitting/visible light-cut filter, the polarizing plate for measurement, and a measurement sample in the order presented, and entered the spectroradiometer. Then, the amount of spectral emission measured at each wavelength in such a manner that the measurement sample and the polarizing plate for measurement were overlaid on each other so that an absorption axis of the measurement sample with the maximum absorption of the ultraviolet ray and an absorption axis of the polarizing plate for measurement were in parallel with each other was defined as Lw (weak emission axis), and the amount of spectral emission measured at each wavelength in such a manner that the measurement sample and the polarizing plate for measurement were overlaid on each other so that an absorption axis of the measurement sample with the maximum absorption of the ultraviolet ray and an absorption axis of the polarizing plate for measurement were perpendicular to each other was defined as Ls (strong emission axis), and Lw and Ls were measured. The amount of energy of emitted light in the visible light region when the absorption axis of a measurement sample and the absorption axis of the common polarizing plate were in parallel with each other and that when these absorption axes were perpendicular to each other were examined to evaluate polarized light emission in a wavelength region of 400 nm to 700 nm in the visible light region. As a value of Lw is smaller and a value of Ls is higher, the values indicate that the polarized light-emitting action is strong, that is, high polarized light-emitting action. The case that difference between values of Lw and Ls is small indicates that the polarized light-emitting action is weak, and a value of "0" for Lw or Ls indicates that emission was not found in the corresponding measurement.

Table 1 shows the single transmittance (Ts), parallel transmittance (Tp), cross transmittance (Tc), and degree of polarization (ρ) at a wavelength with the maximum degree of polarization, and luminous efficiency corrected single transmittance (Ys) for the measurement samples obtained in Examples 1 to 8 and Comparative Examples 1 to 3.

TABLE 1

| | Wavelength with maximum degree of polarization (nm) | Ts (%) | Tp (%) | Tc (%) | ρ (%) | Ys (%) |
|---|---|---|---|---|---|---|
| Example 1 | 391 | 41.86 | 28.60 | 6.44 | 79.53 | 90.72 |
| Example 2 | 350 | 31.73 | 19.55 | 0.60 | 97.00 | 90.87 |
| Example 3 | 391 | 32.15 | 19.23 | 1.45 | 92.75 | 90.05 |
| Example 4 | 389 | 41.92 | 32.26 | 2.89 | 91.40 | 91.39 |
| Example 5 | 375 | 39.40 | 29.73 | 1.32 | 95.67 | 92.10 |
| Example 6 | 375 | 40.40 | 31.05 | 1.60 | 94.98 | 91.66 |
| Example 7 | 375 | 41.40 | 31.77 | 2.51 | 92.38 | 91.48 |
| Example 8 | 375 | 38.40 | 28.25 | 1.24 | 95.70 | 91.61 |
| Comparative Example 1 | 406 | 43.27 | 35.73 | 1.72 | 95.30 | 87.90 |
| Comparative Example 2 | 413 | 42.28 | 35.10 | 0.65 | 98.17 | 86.43 |
| Comparative Example 3 | 510 | 35.22 | 20.75 | 4.06 | 82.02 | 58.42 |

Table 2 shows Ls and Lw at different wavelengths for Examples 1 to 8 and Comparative Examples 1 to 3.

TABLE 2

| | | Wavelength | | | |
|---|---|---|---|---|---|
| | | 400 (nm) | 500 (nm) | 600 (nm) | 700 (nm) |
| Example 1 | Lw (µW/cm$^2$) | 0.13 | 0.10 | 0.03 | 0.05 |
| | Ls (µW/cm$^2$) | 0.15 | 0.28 | 0.08 | 0.05 |
| Example 2 | Lw (µW/cm$^2$) | 0.04 | 0.27 | 0.23 | 0.07 |
| | Ls (µW/cm$^2$) | 0.13 | 0.72 | 0.79 | 0.27 |
| Example 3 | Lw (µW/cm$^2$) | 0.12 | 0.15 | 0.12 | 0.11 |
| | Ls (µW/cm$^2$) | 0.37 | 0.31 | 0.24 | 0.14 |
| Example 4 | Lw (µW/cm$^2$) | 0.10 | 0.13 | 0.11 | 0.13 |
| | Ls (µW/cm$^2$) | 0.41 | 0.61 | 0.34 | 0.22 |
| Example 5 | Lw (µW/cm$^2$) | 0.09 | 0.04 | 0.03 | 0.02 |
| | Ls (µW/cm$^2$) | 1.16 | 0.14 | 0.03 | 0.02 |
| Example 6 | Lw (µW/cm$^2$) | 0.16 | 0.09 | 0.02 | 0.02 |
| | Ls (µW/cm$^2$) | 1.38 | 0.15 | 0.04 | 0.03 |
| Example 7 | Lw (µW/cm$^2$) | 0.12 | 0.05 | 0.03 | 0.02 |
| | Ls (µW/cm$^2$) | 1.09 | 0.17 | 0.05 | 0.03 |
| Example 8 | Lw (µW/cm$^2$) | 0.19 | 0.06 | 0.03 | 0.02 |
| | Ls (µW/cm$^2$) | 1.21 | 0.12 | 0.04 | 0.02 |
| Comparative Example 1 | Lw (µW/cm$^2$) | 0.00 | 0.00 | 0.00 | 0.00 |
| | Ls (µW/cm$^2$) | 0.00 | 0.00 | 0.00 | 0.00 |
| Comparative Example 2 | Lw (µW/cm$^2$) | 0.00 | 0.00 | 0.00 | 0.00 |
| | Ls (µW/cm$^2$) | 0.00 | 0.00 | 0.00 | 0.00 |
| Comparative Example 3 | Lw (µW/cm$^2$) | 0.00 | 0.00 | 0.00 | 0.00 |
| | Ls (µW/cm$^2$) | 0.00 | 0.00 | 0.00 | 0.00 |

As shown in Table 1, each of the measurement samples of Examples 1 to 8 exhibited absorption in the ultraviolet light region, and hence was found to function as a polarizer in the ultraviolet wavelength band. Further, each of the measurement samples of Examples 1 to 8 exhibited a transmittance (luminous efficiency corrected transmittance Ys) of 90% or higher in the visible light region, and hence was found to have high transparency in the visible light region in combination with polarization in the ultraviolet light region. Furthermore, as shown in Table 2, values of Lw and Ls were detected in the visible light region for the measurement samples of Examples 1 to 8, and hence they were found to emit light in a wide wavelength band of 400 to 700 nm on being irradiated with an ultraviolet ray, and in addition the light emitted was found to be polarized because of the presence of difference between values of Lw and Ls. In summary, the measurement samples of Examples 1 to 8 were found to exhibit polarized light-emitting action in the visible light region on being irradiated with an ultraviolet ray. In particular, the measurement samples of Examples 2 to 8 each provided large difference between values of Lw and Ls, exhibiting high polarized light-emitting action. By contrast, the measurement samples of Comparative Examples 1 to 3 each provided "0" for both measurements of Lw and Ls at each wavelength. From the results, the polarizing plates of Comparative Examples 1 to 3 were found to exhibit no polarized light-emitting action even on being irradiated with an ultraviolet ray.

Durability Test

Further, a durability test was conducted to leave the measurement samples of Examples 1 to 8 in an environment at 105° C. for 1000 hours and in an environment at 60° C. with a relative humidity of 90% for 1000 hours. Neither lowering of the degree of polarization nor change in polarized light emission was observed for any of the measurement samples of Examples 1 to 8. It is found that the measurement samples of Examples 1 to 8 each exhibit high durability even in severe environments.

By using the stilbene-based compound according to the present disclosure as a polarizer, polarizing films and polarizing plates that not only have a high degree of polarization but also exhibit polarized light-emitting action can be obtained. Accordingly, polarizing films and polarizing plates using the stilbene-based compound according to the present disclosure can be applied as a self-emitting polarizing film, namely, a polarized light-emitting film. Such polarizing films and polarizing plates have high transmittance in the visible light region in combination with superior durability. Accordingly, display devices using the polarizing film or polarizing plate according to the present disclosure have high transparency in the visible light region and can display images through polarized light emission for a long period of time, and hence are applicable to a wide variety of uses such as televisions, computers, tablet devices, and moreover transparent displays (see-through displays). Further, polarizing films and polarizing plates produced by using the stilbene-based compound according to the present disclosure can emit light with use of ultraviolet light, and hence can be applied to displays and media requiring high security.

What is claimed is:

1. A polarizing film comprising a substrate containing a stilbene-based compound or a salt thereof represented by a following formula (1):

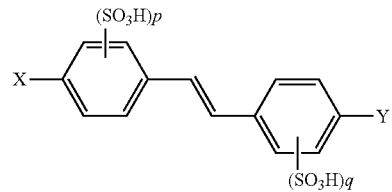

(1)

wherein a group X represents a nitro group or an amino group optionally having a substituent; a group Y represents an amide group optionally having a substituent or a naphthotriazole group optionally having a substituent, and p and q each independently represent an integer of 0 to 2, wherein the group X and the group Y do not include an azo bond.

2. The polarizing film according to claim 1, having a polarized light-emitting function of emitting polarized light in a visible light region.

3. The polarizing film according to claim 1, further comprising one or more organic dyes or fluorescent dyes differing from the stilbene-based compound or a salt thereof.

4. The polarizing film according to claim 1, wherein the substrate is a film produced from a polyvinyl alcohol resin or a derivative thereof.

* * * * *